(12) United States Patent
Lei et al.

(10) Patent No.: US 11,279,644 B2
(45) Date of Patent: Mar. 22, 2022

(54) PHOSPHORUS CONTROL FOR WASTE STREAMS FROM GLYPHOSATE MANUFACTURING PROCESSES

(71) Applicant: Monsanto Technology LLC, St. Louis, MO (US)

(72) Inventors: Peng Lei, St. Louis, MO (US); Ming Ren, Chesterfield, MO (US); Anthony E. Vaughn, St. Charles, MO (US)

(73) Assignee: Monsanto Technology LLC, St. Louis, MO (US)

( * ) Notice: Subject to any disclaimer, the term of this patent is extended or adjusted under 35 U.S.C. 154(b) by 75 days.

(21) Appl. No.: 16/624,442

(22) PCT Filed: Jun. 26, 2018

(86) PCT No.: PCT/US2018/039385
§ 371 (c)(1),
(2) Date: Dec. 19, 2019

(87) PCT Pub. No.: WO2019/005718
PCT Pub. Date: Jan. 3, 2019

(65) Prior Publication Data
US 2020/0131067 A1      Apr. 30, 2020

Related U.S. Application Data

(60) Provisional application No. 62/524,675, filed on Jun. 26, 2017.

(51) Int. Cl.
*C02F 9/00*     (2006.01)
*C01B 25/26*    (2006.01)
(Continued)

(52) U.S. Cl.
CPC ............. *C02F 9/00* (2013.01); *C01B 25/26* (2013.01); *C07F 9/025* (2013.01); *C07F 9/3808* (2013.01);
(Continued)

(58) Field of Classification Search
CPC ...................................................... C02F 9/00
See application file for complete search history.

(56) References Cited

U.S. PATENT DOCUMENTS 3,617,569 A   7/1971  Daniels et al.
3,950,402 A   4/1976  Franz
(Continued)

FOREIGN PATENT DOCUMENTS

CA    1214020 A    11/1986
CN    102001792 A   4/2011
(Continued)

OTHER PUBLICATIONS

Extended European Search Report dated Feb. 9, 2021, Application No. 18823599.8-1105 / 3645458 PCT/US2018039385. 8 pages.
(Continued)

*Primary Examiner* — Peter Keyworth
(74) *Attorney, Agent, or Firm* — Stinson LLP

(57) ABSTRACT

This invention relates to processes for the removal of phosphorous from aqueous waste streams comprising phosphorous-containing compounds produced in the manufacture of glyphosate, in order to meet and typically exceed environmental regulations. More particularly, various embodiments of the present invention relate to the removal of phosphorous-containing compounds utilizing biological treatment system(s), oxidizing agent(s), and/or precipitant(s). The processes of the invention are also applicable to the removal of phosphorous compounds from
(Continued)

phosphorous-containing waste streams other than those waste streams resulting from the manufacture of glyphosate.

19 Claims, 3 Drawing Sheets

(51) Int. Cl.
    *C07F 9/02*     (2006.01)
    *C07F 9/38*     (2006.01)
    *C02F 1/52*     (2006.01)
    *C02F 1/76*     (2006.01)
    *C02F 3/12*     (2006.01)
    *C02F 101/10*     (2006.01)
    *C02F 103/36*     (2006.01)

(52) U.S. Cl.
    CPC .......... *C07F 9/3813* (2013.01); *C02F 1/5245* (2013.01); *C02F 1/76* (2013.01); *C02F 3/1215* (2013.01); *C02F 2101/105* (2013.01); *C02F 2103/36* (2013.01)

(56) References Cited

U.S. PATENT DOCUMENTS

| | | | |
|---|---|---|---|
| 3,956,118 | A | 5/1976 | Kleber et al. |
| 3,969,398 | A | 7/1976 | Heershman |
| 4,402,833 | A | 9/1983 | Bennett et al. |
| 4,582,650 | A | 4/1986 | Felthouse |
| 4,624,937 | A | 11/1986 | Chou |
| 4,696,772 | A | 9/1987 | Chou |
| 5,154,830 | A | 10/1992 | Paul et al. |
| 5,179,228 | A | 1/1993 | Martin Ramon et al. |
| 5,582,739 | A | 12/1996 | Kaiser et al. |
| 5,616,241 | A | 4/1997 | Khudenko |
| 5,820,761 | A | 10/1998 | Holzer et al. |
| 6,417,133 | B1 | 7/2002 | Ebner et al. |
| 6,586,621 | B2 | 7/2003 | Leiber et al. |
| 7,015,351 | B2 | 3/2006 | Haupfear et al. |
| 7,563,373 | B2 | 7/2009 | Bolduc |
| 2004/0144728 | A1 | 7/2004 | Moller et al. |
| 2012/0187337 | A1* | 7/2012 | Hassler ................ C02F 1/5236 252/183.13 |
| 2013/0068701 | A1 | 3/2013 | Bain et al. |
| 2014/0234196 | A1* | 8/2014 | Choi ...................... C02F 1/72 423/318 |
| 2015/0336823 | A1 | 11/2015 | Zeng |
| 2015/0376043 | A1 | 12/2015 | Wett et al. |
| 2017/0267561 | A1* | 9/2017 | Randal ............... B01D 21/0009 |

FOREIGN PATENT DOCUMENTS

| | | |
|---|---|---|
| CN | 101671089 B | 7/2011 |
| CN | 102180535 A | 9/2011 |
| CN | 102173518 B | 7/2012 |
| CN | 101941770 B | 8/2012 |
| CN | 102627361 A | 8/2012 |
| CN | 102173496 B | 1/2013 |
| CN | 102897970 B | 1/2014 |
| CN | 103626276 A | 3/2014 |
| CN | 102775012 B | 7/2014 |
| CN | 104163486 A | 11/2014 |
| CN | 104310700 A | 1/2015 |
| CN | 105314762 A | 2/2016 |
| CN | 103121772 B | 5/2016 |
| DE | 102005040018 B4 | 5/2014 |
| EP | 0335280 A1 | 3/1989 |
| EP | 2093196 B1 | 10/2014 |
| WO | 00/01707 A1 | 1/2000 |
| WO | 00/09517 A2 | 2/2000 |
| WO | 2015/150631 A1 | 10/2015 |

OTHER PUBLICATIONS

Babayemi, K.A., et al., "Phosphate Removal from Phosphorus Containing Watewater by Coagulation/Flocculation Process Using *Gossypium* spp. (GS) as Coagulant," 2015, CAES, 3/1:1-5, 5 pages.

Brosillon, S., et al., "Chlorination Kinetics of Glyphosate and Its By-Products: Modeling Approach," 2006, Water Research, 40:2113-2124, 12 pages.

Cesaro, A., et al., "Wastewater Treatment by Combination of Advanced Oxidation Processes and Conventional Biological Systems," 2013, J Bioremed Biodeg, 4-8. 8 pages.

Chen, J., et al., "Enhancing Phosphate Removal by Coagulation using Polyelectolytes and Red Mud," 2010, Fresenius Environmental Bulletin, 19/10:2200-2204, 5 pages.

Franz, J.E., et al., "Glyphosate: A Unique Global Herbicide. Chapter 8. Methods of Preparing Glyphosate" 1997, ACS Monograph 189, pp. 233-262. 17 pages.

Fytianos, K., et al., "Modelling of Phosphorous Removal from Aqueous and Wastewater Samples Using Ferric Iron," 1998, Environmental Pollution, 101/1:123-130, Abstract Only, 1 page.

Grzmil, B., et al., "Removal of Phosphates and Fluorides from Industrial Wastewater," 2006, Desalination, 189/1-3:261-268, Abstract Only, 1 page.

Jönsson, J., et al., "Removal and Degadation of Glyphosate in Water Treatment: A Review," 2013, J Water Supply: Research and Technology—AQUA, IWA Publishing, 62.7, 395-408, 14 pages.

Maurer, M., et al., "Modelling of Phosphorus Precipitation in Wastewater Treatment Plants with Enhanced Biological Phosphorus Removal," 1999, Wat Sci Tech, 39/1:147-163, 17 pages.

Mehrsheikh, A., et al., "Investigation of the Mechanism of Cholorination of Glyphosate and Glycine in Water," 2006, Water Research, 40:3003-3014, 12 pages.

Monnig, E., et al., "Treatment Technology for Pesticide Manufacturing Effluents: Glyphosate," Res Triangle Inst, Contract No. 68-02-3688, Ind Env Res Lab, Ofice of Res and Dev, U.S. EPA, Feb. 15, 1980, 53 pages.

Morse, G.K., et al., "Review: Phosphorus Removal and Recovery Technologies," 1998, The Science of the Total Environment, 212:69-81, 13 pages.

Phosphorous Removal from Wastewater, Lenntech BV, Copyright 1995-2016, 4 pages.

Panasiuk, O., "Phosphorus Removal and Recovery from Wastewater Using Magnetite," 2010, Master of Science Thesis, Presented at Industrial Ecology Royal Institute of Technolgy, www.ima.kth.se, 48 pages.

Sarparastzadeh, H., et al., "Pretreatment of Municipal Wastewater by Enhanced Chemical Coagulation," 2007, Int. J. Environ. Res., 1/2:104-113, 10 pages.

International Search Report and Written Opinion issued in PCT/US2018/039385, dated Sep. 7, 2018, 15 pages.

\* cited by examiner

PHOSPHORUS CONTROL FOR WASTE STREAMS FROM GLYPHOSATE MANUFACTURING PROCESSES

REFERENCE TO RELATED APPLICATIONS

The present application is the 371 National Stage Application of International Patent Application Serial No. PCT/US2018/039385, filed Jun. 26, 2018, which claims the benefit of U.S. Provisional Application Ser. No. 62/524,675, filed Jun. 26, 2017, the entire contents of which are incorporated herein by reference.

FIELD OF THE INVENTION

This invention relates to processes for the removal of phosphorous from aqueous waste streams comprising phosphorus-containing compounds produced in the manufacture of glyphosate, in order to meet and typically exceed environmental regulations. More particularly, various embodiments of the present invention relate to the removal of phosphorous-containing compounds utilizing biological treatment system(s), oxidizing agent(s), and/or precipitant(s). The processes of the invention are also applicable to the removal of phosphorous compounds from phosphorous-containing waste streams other than those waste streams resulting from the manufacture of glyphosate.

BACKGROUND OF THE INVENTION

N-(phosphonomethyl)glycine (glyphosate) and its salts are conveniently applied as a component in aqueous, post-emergent herbicidal formulations. As such, they are particularly useful as highly effective and commercially important broad-spectrum herbicides for killing or controlling the growth of a wide variety of plants, including germinating seeds, emerging seedlings, maturing and established woody and herbaceous vegetation and aquatic plants.

Various methods for preparation of glyphosate have been developed. One method includes the catalyzed liquid phase oxidative cleavage of a carboxymethyl substituent from an N-(phosphonomethyl)iminodiacetic acid (PMIDA) substrate. Over the years, a wide variety of methods and reactor systems have been disclosed for conducting this oxidation reaction. See generally, Franz, et al., Glyphosate: A Unique Global Herbicide (ACS Monograph 189, 1997) at pp. 233-62 (and references cited therein); Franz, U.S. Pat. No. 3,950,402; Hershman, U.S. Pat. No. 3,969,398; Felthouse, U.S. Pat. No. 4,582,650; Chou, U.S. Pat. No. 4,624,937; Chou, U.S. Pat. No. 4,696,772; Ramon et al., U.S. Pat. No. 5,179,228; Siebenhaar et al., International Publication No. WO 00/01707; Ebner et al., U.S. Pat. No. 6,417,133; Leiber et al., U.S. Pat. No. 6,586,621; and Haupfear et al., U.S. Pat. No. 7,015,351.

The reaction may be conducted in either a batch or continuous oxidation reactor system in the presence of a catalyst that typically comprises particulate carbon, or a noble metal such as platinum on a particulate carbon support. The catalyst is usually slurried in an aqueous solution of PMIDA within a stirred tank reactor, and molecular oxygen is introduced into the reactor to serve as the oxidizing agent. The reaction is exothermic. The liquid phase oxidation of a PMIDA substrate typically produces a reaction mixture containing water and various impurities besides the desired N-(phosphonomethyl)glycine product. These impurities may include, for example, various by-products, unreacted starting materials, as well as impurities present in the starting materials. Representative examples of impurities present in N-(phosphonomethyl)glycine product reaction mixtures include, for example, unreacted PMIDA substrate, N-formyl-N-(phosphonomethyl)glycine (NFG), phosphoric acid, phosphorous acid, N-methyl-N-(phosphonomethyl)glycine (NMG), glycine, aminomethylphosphonic acid (AMPA), methyl aminomethylphosphonic acid (MAMPA), iminodiacetic acid (IDA), imino-bis-(methylene)-bis-phosphonic acid (iminobis), formaldehyde, formic acid, chlorides, and ammonium sulfate.

Regardless of the precise method by which a glyphosate product is manufactured, a concentrated glyphosate product, or wet cake can be prepared from the resulting reaction product solution. Preparation of the glyphosate wet cake also produces a filtrate, or mother liquor that contains various impurities, along with a portion of the glyphosate product not isolated in the wet cake. Removal and recovery of phosphorous from the filtrate or mother liquor (hereinafter referenced as the waste stream) produced during glyphosate manufacture is important to avoid the undesired environmental consequences associated therewith and to meet environmental regulations.

There exists a need in the art for improved processes for recovery of phosphorus from the waste stream of glyphosate manufacture and other waste streams. These improved processes are of particular importance and utility as governmental regulations regarding the acceptable phosphorous content of waste streams continue to become more stringent.

SUMMARY OF THE INVENTION

This invention provides a process for the removal of phosphorous from a waste stream, including one or more of the steps of contact with a precipitant, contact with an oxidizing agent, and/or biological treatment.

Briefly, therefore, the present invention is directed to processes for the recovery of phosphorus from aqueous waste streams comprising organic phosphorus compounds. In certain embodiments, the waste stream may comprise inorganic phosphorous compounds in addition to or in place of the organic phosphorous compounds. The process comprises contacting the waste stream comprising phosphorus and organic carbon with a precipitant to produce phosphorous-containing particulates and/or a phosphorus-containing cake. In certain other embodiments, the process comprises oxidizing one or more compounds containing phosphorus and organic carbon present in a waste stream to produce an oxidized treated waste stream and then contacting the oxidized treated waste stream with a precipitant in order to produce phosphorous-containing particulates and/or a phosphorus-containing cake.

In other embodiments, the process for the recovery of phosphorus from aqueous waste streams comprising organic phosphorus compounds, inorganic phosphorus compounds, or a combination thereof comprises contacting the waste stream with a biological treatment system to produce phosphorous-containing particulates and/or a phosphorus-containing cake. In certain preferred embodiments the biological treatment system is an aerobic biological treatment.

The present invention is also directed to processes for the recovery of phosphorus from an aqueous waste stream comprising organic phosphorus compounds, inorganic phosphorus compounds, or a combination thereof comprising one or more of the steps of contacting the waste stream with an oxidizing agent, contacting the waste stream with a precipitant, and/or contacting the waste stream with a biological treatment system. In various embodiments of the present invention, the process may comprise an assortment of selections and orderings of the steps comprising use of an oxidizing agent, use of a precipitant, and/or use of a biological system. Such step(s) may be selected and ordered so as to optimize the recovery of phosphorus and/or to optimize operational costs.

Other objects and features will be in part apparent and in part pointed out hereinafter.

DETAILED DESCRIPTION OF THE PREFERRED EMBODIMENTS

Figure 1:
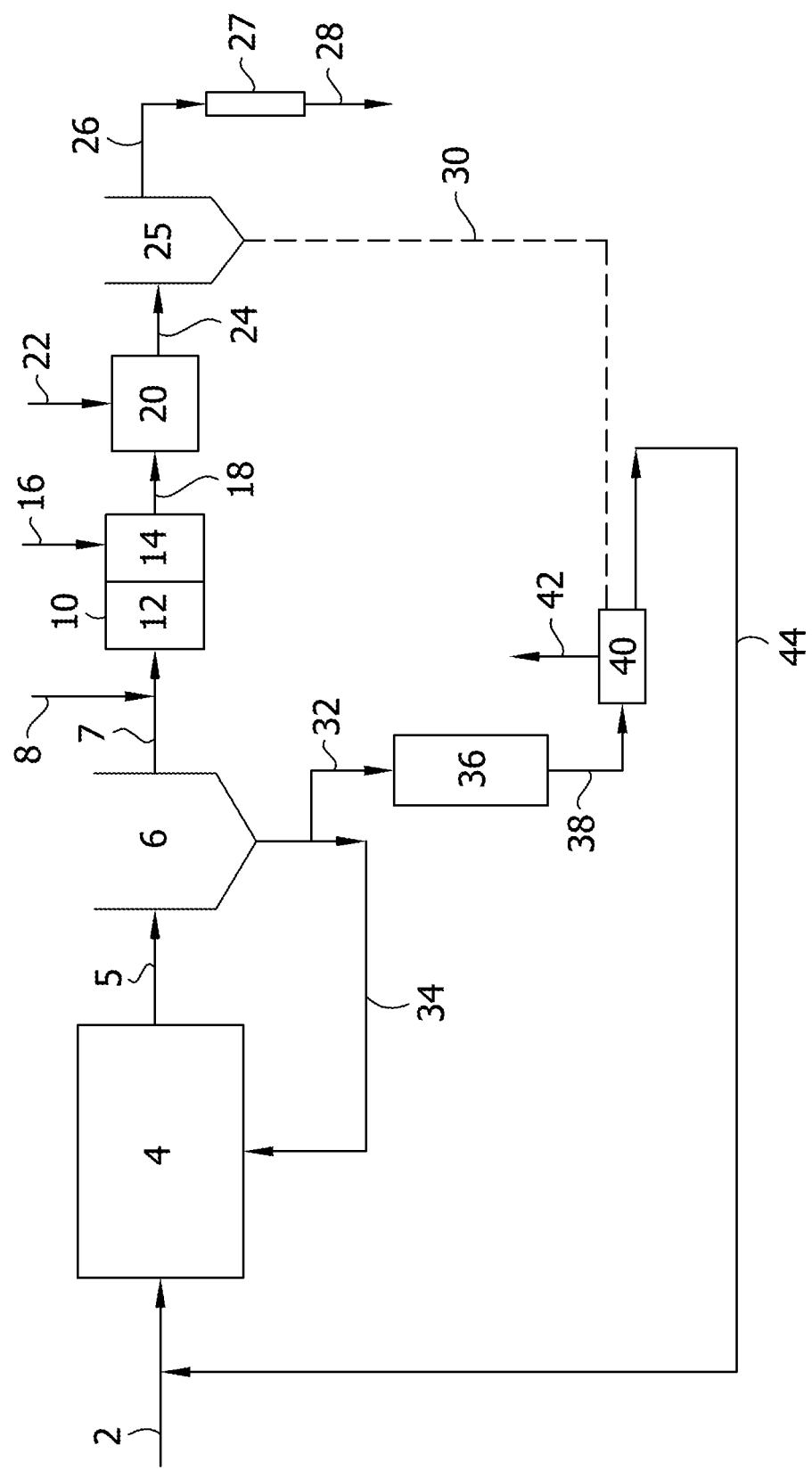
FIG. 1 sets forth the process flow diagram of a waste stream comprising organic phosphorus compounds and various other impurities that is biologically treated, oxidized, and then contacted with a precipitant as described herein.

Described herein are processes for the recovery of phosphorus from aqueous waste streams comprising phosphorus-containing compounds (e.g., inorganic and organic phosphorus compounds). Processes of the present invention are suitable for recovery of phosphorus from a variety of aqueous waste streams, including aqueous waste streams generated in the manufacture of phospho-herbicides. For example, described herein are processes for recovery of phosphorus from aqueous waste streams generated in the manufacture of glyphosate. Similarly, the processes of the present invention are also suitable for recovery of phosphorus from aqueous process streams generated in the manufacture of precursors of phospho-herbicides such as glyphosate. For example, various embodiments of the present invention are directed to recovery of phosphorus from aqueous waste streams comprising the glyphosate precursor PMIDA.

Much of the following discussion focuses on processes for recovery of phosphorus from aqueous waste streams generated in the manufacture of glyphosate, but it is to be understood that the processes detailed herein may be readily adapted to recovery of phosphorus from various other waste streams comprising various organic phosphorus and inorganic phosphorous compounds including waste streams generated in the manufacture of PMIDA.

Generally, glyphosate manufacture produces aqueous waste streams (e.g., mother liquor generated in glyphosate wet cake production) containing up to approximately 2 wt. % glyphosate, up to approximately 10 wt. % sodium chloride, various phosphonic acids, ammonium sulfate, and various other impurities. In the process of treatment of waste streams of one or more embodiments of the present invention, glyphosate, phosphate, NMG AMPA, and MAMPA are typically present.

In addition to removing phosphorous from the waste stream, it is also an object of the present invention to reduce the chemical oxygen demand (COD) of the waste stream. COD is generally understood to be the amount of oxygen required to oxidize organic chemical compounds to a stable, non-oxygen consuming, form. Oxygen demand, for example COD, may be an important metric for evaluating the amount of organic compounds present in a waste stream. Therefore, a reduced COD value after treatment by the process of the present invention is further indication that a substantial amount of the organic phosphorous has been removed from the waste stream. Typically COD is reported in milligrams of oxygen per liter of treated liquid.

Another useful metric for evaluating the amount of organic contaminant present in the waste stream is biological oxygen demand (BOD). BOD is the amount of oxygen that would be consumed if all the organic material in one liter of water were oxidized by microorganisms. The greater the relative amount of organic matter to be oxidized, the greater the relative amount of oxygen that will be needed by microorganisms within a wastewater biotreatment system in order to oxidize that amount of organic matter. As with COD, a reduced BOD value after treatment by the process of the present invention is further indication that a substantial amount of the organic phosphorous has been removed from the waste stream.

It is to be understood that recovered phosphorous in the context of the present invention refers to phosphorus recovered from the waste stream, regardless of the source of the phosphorus. For example, recovered phosphorus may be derived from organic phosphorus compounds (e.g., glyphosate, PMIDA, aminomethylphosphonic acid, hydroxymethylphosphonic acid, N-formyl-N-(phosphonomethyl)glycine, N-methyl-N-(phosphonomethyl)glycine, methyl aminomethylphosphonic acid and salts thereof), and may also be provided by other components of the aqueous waste stream (e.g., phosphoric acid, phosphorous acid, and salts thereof). In some embodiments, phosphorus is recovered in the form of phosphoric acid.

As previously noted, processes of the present invention are suitable for recovery of phosphorus compounds from aqueous waste streams comprising one or more phospho-herbicide precursors. For example, various embodiments of the present invention are directed to the recovery of phosphorous compounds, such as PMIDA, from aqueous process streams generated in the manufacture of glyphosate. The processes of the present invention are likewise suitable for recovery of phosphorus compounds from aqueous waste streams generated in the manufacture of glufosinate. A variety of processes for preparation of glufosinate are known in the art. Many of these processes utilize phosphorus-containing compounds (e.g., $PCl_3$) and basic compounds (e.g., sodium hydroxide and/or potassium hydroxide). At least in part because these routes for the preparation of glufosinate typically utilize phosphorus trichloride, phosphorus compound containing waste streams are typically generated. It is currently believed that various aqueous waste streams generated in the manufacture of glufosinate (e.g., the mother liquor resulting from preparation of glufosinate wet-cake) include phosphorus compounds that may be recovered by the processes of the present invention.

Oxidizing Agents

In various embodiments of the present invention, the process may comprise contacting the stream to be treated with an oxidizing agent. In certain embodiments, the stream to be contacted with an oxidizing agent may be a biologically treated waste stream (as described in further detail below). Oxidation of the one or more compounds containing phosphorus and organic carbon present in a waste stream allows for the production of a phosphorous-containing cake and an oxidized treated waste stream. The phosphorous containing cake may then be discarded or further processed.

Oxidation may be undertaken by exposing at least a portion of the waste stream to an oxidizing agent. In certain non-limiting embodiments, the oxidizing agent may be selected from the group consisting of calcium hydrochlorite, sodium hydrochlorite, other suitable sources of chlorine, and combinations thereof. In certain preferred embodiments, the oxidizing agent may comprise bleach. The term bleach is understood by one skilled in the art to encompass a wide range of chemical compositions. In one embodiment, the term bleach may describe an aqueous solution of sodium hypochlorite, for example, about 3-6 wt % sodium hypochlorite. In certain other embodiments, bleach may comprise an aqueous solution of sodium hypochlorite further comprising calcium hypochlorite.

The phosphorous containing compounds to be oxidized may be present in one or more components of the aqueous waste stream. For example, in the case of an aqueous waste stream generated in a N-(phosphonomethyl)iminodiacetic acid (PMIDA)-based route of glyphosate manufacture, phosphorus to be oxidized in such waste streams is typically present in glyphosate, unreacted PMIDA substrate, N-formyl-N-(phosphonomethyl)glycine (NFG), N-methyl-N-(phosphonomethyl)glycine (NMG), phosphoric acid, phosphorous acid, aminomethylphosphonic acid (AMPA), and/or methyl aminomethylphosphonic acid (MAMPA). In the case of aqueous waste streams generated in the glycine-based route of glyphosate manufacture, phosphorus to be oxidized may be present in glyphosate, glyphosine, phosphorous acid, phosphoric acid, and/or hydroxymethylphosphonic acid.

Generally, oxidation of compounds containing phosphorus and organic carbon produces phosphorous-containing particulates and/or a phosphorous-containing cake. For example, sodium hydrochlorite may be used to oxidize methyl aminomethylphosphonic acid and produce a phosphate containing cake.

In certain, non-limiting, embodiments, the amount of oxidizing agent used to treat the waste stream may be at least about 1 ppm, at least about 2.5 ppm, at least about 5 ppm, at least about 7.5 ppm, at least about 10 ppm, at least about 15 ppm, at least about 20 ppm, at least about 25 ppm, or at least about 30 ppm. The amount of oxidizing agent used to treat the waste stream may be between about 1 ppm and about 30 ppm, between about 2 ppm and about 25 ppm, between about 3 ppm and about 25 ppm, between about 4 ppm and about 25 ppm, between about 5 ppm and about 25 ppm, between about 5 ppm and about 20 ppm, between about 5 ppm and about 20 ppm, between about 5 ppm and about 15 ppm, between about 10 ppm and about 15 ppm, or between about 12.5 ppm and about 15 ppm.

In certain, non-limiting, embodiments, the molar ratio of oxidizing agent to glyphosate present in the waste stream may be at least about 1:1, at least about 2:1, at least about 3:1, at least about 5:1, at least about 10:1, or at least about 15:1. The molar ratio of oxidizing agent to glyphosate present in the waste stream may be from about 1:1 to about 15:1, from about 5:1 to about 15:1, or from about 10:1 to about 15:1. In certain embodiments, the molar ratio of oxidizing agent to glyphosate present in the waste stream may be from about 1:1 to about 10:1. A large amount of oxidizing agent relative to glyphosate in the stream, for example a molar ratio of greater than 10:1, particularly where the pH is in the range of 6-9, aids in reducing the amount of undesirable byproducts of the oxidation reaction, such as cyanogen chloride (CNCl).

In certain, non-limiting, embodiments, the molar ratio of oxidizing agent to AMPA present in the waste stream may be at least about 1:1, at least about 2:1, at least about 3:1, at least about 5:1, at least about 10:1, or at least about 15:1. The molar ratio of oxidizing agent to AMPA present in the waste stream may be from about 1:1 to about 15:1, from about 5:1 to about 15:1, or from about 10:1 to about 15:1. In certain embodiments, the molar ratio of oxidizing agent to AMPA present in the waste stream may be from about 1:1 to about 10:1. A large amount of oxidizing agent relative to AMPA in the stream, for example a molar ratio of greater than 5:1, particularly where the pH is in the range of 7-9 or 8-9, aids in reducing the amount of undesirable byproducts of the oxidation reaction, such as cyanogen chloride (CNCl).

In certain, non-limiting, embodiments, the amount of oxidizing agent used to treat the biologically treated waste stream (set forth in detail below) may be at least about 1 ppm, at least about 2.5 ppm, at least about 5 ppm, at least about 7.5 ppm, at least about 10 ppm, at least about 15 ppm, at least about 20 ppm, at least about 25 ppm, or at least about 30 ppm. The amount of oxidizing agent used to treat the biologically treated waste stream may be between about 1 ppm and about 30 ppm, between about 2 ppm and about 25 ppm, between about 3 ppm and about 25 ppm, between about 4 ppm and about 25 ppm, between about 5 ppm and about 25 ppm, between about 5 ppm and about 20 ppm, between about 5 ppm and about 20 ppm, between about 5 ppm and about 15 ppm, between about 10 ppm and about 15 ppm, or between about 12.5 ppm and about 15 ppm.

In certain embodiments, the appropriate waste stream may be contacted with an oxidizing agent at a temperature no greater than about 50° C., no greater than about 40° C., no greater than about 35° C., or no greater than about 30° C. For example, the appropriate waste stream may be contacted with an oxidizing agent at a temperature from about 20° C. to about 50° C., from about 25° C. to about 50° C., from about 25° C. to about 40° C., or from about 30° C. to about 35° C.

In certain embodiments, the waste stream to be contacted with the oxidizing agent may have a pH from about 3 to about 9, from about 4 to about 9, from about 5 to about 9, from about 6 to about 9, or from about 6 to about 8.

In certain embodiments, it may be desirable to maintain a high pH during the oxidation step to reduce the accumulation of undesirable products such as cyanogen chloride (CNCl). For example, the pH of the oxidation step may be maintained at a pH greater than about 7, greater than about 8, greater than about 9, or even greater than about 10.

In batch treatment processes, the oxidizing agent is typically allowed to react for at least about 15 minutes, at least about 30 minutes, at least about 45 minutes, at least about 1 hour, at least about 1.5 hours, at least about 2 hours, or at least about 3 hours. For example, in some embodiments, the oxidizing agent should be allowed to react for no more than about 1 hour, no more than about 2 hours, or no more than about 3 hours. In certain embodiments, after the oxidation step, a reducing agent/neutralizing agent may be added to neutralize any excess oxidizing agent still present. For example, when the oxidizing agent is sodium hypochlorite, bisulfite may be used to neutralize the remaining sodium hypochlorite. One skilled in the art will understand that certain reducing agents/neutralizing agents may be appropriate in some situations, but may not be appropriate to neutralize other oxidizing agents.

Precipitant

In some embodiments, following the oxidizing step, the oxidized treated waste stream is contacted with a precipitant. In certain other embodiments, a precipitant is contacted with the waste stream wherein the process does not comprise an oxidizing step, or does not comprise an oxidizing step prior to contact with the precipitant. In certain embodiments, the waste stream to be contacted with a precipitant may be a biologically treated waste stream (as described in further detail below).

The oxidized treated waste stream, biologically treated waste stream, or waste stream may be contacted with one or more precipitants in accordance with certain embodiments of the present invention. Similar to the oxidation step, the use of a precipitant in a waste stream comprising phosphorous allows for the precipitation and formation of phosphorous-containing particles and/or a phosphorous-containing cake. In embodiments wherein an oxidizing step is not utilized before precipitation, more precipitant may be needed in order to form phosphorous-containing particles and/or a phosphorous-containing cake.

One skilled in the art will understand that the term "precipitant" may encompass numerous elements, compounds, and compositions. However, the precipitant may comprise any agent known in the art to facilitate a bond between certain ions/molecules and metal ions/molecules. For example, in one embodiment, the precipitant may act as chelate. Generally, for example, the precipitant may be selected from the group consisting of compounds comprising calcium, aluminum, iron, magnesium, and mixtures thereof. In certain embodiments, and without limitation, precipitants particularly suitable for the present invention may be selected from the group consisting of $FeCl_3$, $Al_2(SO_4)_3$, CaO, and mixtures thereof. In one embodiment, the precipitant may be PAC-18 (18% polyaluminum chloride). In certain further embodiments, the phosphorous-containing particles may coagulate upon precipitation and form a phosphorous-containing cake.

In certain embodiments, the pH of the waste stream prior to contact with the precipitant is less than about 7, less than about 6, less than about 5, less than about 4, less than about 3, or less than about 2. In certain embodiments, the pH prior to contract with the precipitant is between about 1 and about 7, between about 1 and about 6, between about 1 and about 5, between about 1 and about 4, or between about 2 and about 4. Preferably, the pH is less than about 7 prior to contact with the precipitant. In one embodiment, the pH is about 6.5.

In certain, non-limiting, embodiments, the amount of precipitant contacted with the oxidized treated waste stream or waste stream may be about 1,000 ppm, or higher. For example, the amount of precipitant used to treat the oxidized treated waste stream or waste stream may be at least about 1,000 ppm, at least about 1,500 ppm, at least about 2,000 ppm, at least about 2,500 ppm, at least about 3,000 ppm, at least about 3,500 ppm, at least about 4,000 ppm, at least about 4,500 ppm, or at least about 5,000 ppm. The amount of precipitant used to treat the oxidized treated waste stream or waste stream may be between about 500 ppm and about 10,000 ppm, between about 1,000 ppm and about 7,500 ppm, between about 1,500 ppm and about 7,000 ppm, between about 2,000 ppm and about 6,000 ppm, or between about 3,000 ppm and about 5,000 ppm.

In certain other embodiments, the amount of precipitant contacted with the oxidized treated waste stream or waste stream may be from about 0.05 g/l to about 2 g/l, from about 0.1 g/l to about 1.75 g/l, from about 0.1 g/l to about 1.5 g/l, from about 0.1 g/l to about 1.25 g/l, or from about 0.1 g/l to about 1.15 g/l.

In certain, non-limiting, embodiments, the amount of precipitant used to treat a biologically treated waste stream may be at least about 1,000 ppm, at least about 1,500 ppm, at least about 2,000 ppm, at least about 2,500 ppm, at least about 3,000 ppm, at least about 3,500 ppm, at least about 4,000 ppm, at least about 4,500 ppm, or at least about 5,000 ppm. The amount of precipitant used to treat the biologically treated waste stream may be between about 500 ppm and about 10,000 ppm, between about 1,000 ppm and about 7,500 ppm, between about 1,500 ppm and about 7,000 ppm, between about 2,000 ppm and about 6,000 ppm, or between about 3,000 ppm and about 5,000 ppm.

In certain other embodiments, the amount of precipitant used to treat a biologically treated waste stream may be from about 0.05 g/l to about 2 g/l, from about 0.1 g/l to about 1.75 g/l, from about 0.1 g/l to about 1.5 g/l, from about 0.1 g/l to about 1.25 g/l, or from about 0.1 g/l to about 1.15 g/l.

In embodiments wherein the waste stream is contacted with an oxidizing agent and the oxidized waste stream is subsequently contacted with a precipitant, the ratio of precipitant to oxidizing agent may be at least about 50:1, at least about 100:1, at least about 200:1, at least about 300:1, at least about 400:1, or at least about 500:1. The ratio of precipitant to oxidizing agent may be from about 50:1 to about 500:1, from about 100:1 to about 500:1, from about 200:1 to about 400:1, from about 250:1 to about 300:1, or from about 275:1 to about 300:1.

Biological Treatment

In various embodiments, the processes of the present invention utilize a biological treatment step in order to recover phosphorous from the waste stream comprising one or more organic phosphorus compounds and phosphate. In addition to recovering phosphorous from the waste stream via biological treatment, biological treatment allows for the conversion of certain phosphorous-containing compounds such as glyphosate into phosphorus-containing compounds such as AMPA. In certain embodiments where one or more operations are combined with biological treatment, the primary phosphorus-containing impurity from which phosphate species are derived may be AMPA.

Prior to contacting the waste stream with a biological treatment step, the pH of the waste stream may be adjusted as necessary. For example, the waste stream may be contacted with a caustic agent (i.e., NaOH) and allowed to adequately mix in an equalization tank. After the caustic and waste streams have mixed, the generally homogenous pH adjusted waste stream may then be subjected to biological treatment. In certain other embodiments, the pH may be adjusted prior to biological treatment by subjecting the stream to a lime bed.

The biological treatment step is utilized in order to degrade certain components (e.g., phosphorous containing compounds) by microorganisms.

Oxygen may be supplied to the biological treatment step in order to ensure continual degradation of organic compounds by the microorganisms. The oxygen may be supplied from an external source or by mechanical means such as stirring the biological treatment tank to aerate the contents. In a preferred embodiment, one or more mechanical aerators are connected to the biological treatment tank to supply oxygen.

In certain embodiments, further nutrients may be added to the biological treatment tank in order to facilitate a more efficient and/or faster biological treatment process. For example, particularly for anaerobic biological treatment, the added nutrient may provide an additional source of chlorine, nitrogen, phosphorous, sulfur, iron, cobalt, nickel, zinc, copper, manganese, molybdenum, selenium, tungsten, boron, or combinations thereof. In one embodiment, the nutrient added to the biological treatment tank may be ferric chloride.

In certain embodiments, the temperature may be maintained from about 15° C. to about 45° C., from about 20° C. to about 40° C., from about 25° C. to about 40° C., or from about 30° C. to about 35° C. Optionally, a cooling system may be included in the biological treatment step to maintain the temperature within the desired range.

In certain embodiments, the biological treatment step is designed such that there is a residence time of from about 0.1 days to about 7 days, from about 0.2 days to about 6 days, from about 0.3 days to about 5 days, from about 0.5 days to about 5 days, from about 1 day to about 4 days, from about 1.5 days to about 4.5 days, from about 1.6 days to about 3 days, or from about 1.7 to about 3 days.

In certain embodiments the biological treatment step may be performed in a tank or other suitable container having a volume of at least about 500 m$^3$, at least about 750 m$^3$, at least about 1,000 m$^3$, at least about 1,500 m$^3$, at least about 2,000 m$^3$, at least about 3,000 m$^3$, at least about 4,000 m$^3$, at least about 5,000 m$^3$, or at least about 6,000 m$^3$.

After biological treatment, the contents of the biologically treated waste stream may be optionally directed to a clarifier. In the clarifier the suspended particles (such as microorganisms, organic, and inorganic matter) are deposited, generating a thick layer of precipitant at the bottom of the clarifier tank. The liquid is removed and directed for further processing and/or disposal. The deposited precipitant may be reintroduced into the biological treatment system or the precipitant may be dried or otherwise processed for disposal.

1. Pre-Treatment with Biological Treatment

In certain preferred embodiments of the present invention, the waste stream is subjected to biological treatment before additional treatment mechanisms are utilized. The biological treatment step may be an aerobic biological treatment, anaerobic biological treatment, or a combination thereof. Preferably, the biological treatment is aerobic. After the waste stream has been biologically treated, a biologically treated waste stream is obtained. This biologically treated waste stream is then contacted with an oxidizing agent and/or precipitant, as set forth above, in order to produce phosphorus-containing precipitates and/or a phosphorus-containing cake. In certain embodiments, the pH of the biologically treated waste stream before being contacted with the precipitant has a pH less than about 7, less than about 6, less than about 5, less than about 4, less than about 3, or less than about 2. Preferably, the pH is less than about 7 prior to contact with the precipitant. In one embodiment, the pH is about 6.5. The biologically treated waste stream from which phosphorus-containing particles are removed forms the treated waste stream that may be discharged from the treatment process or may be directed for further processing.

Biological treatment allows for the conversion of at least a portion of the remaining glyphosate in the waste stream to AMPA (aminomethylphosphonic acid). If the biologically treated waste stream is subsequently treated with an oxidizing agent, at least a portion of the AMPA present in the stream may be converted into phosphate. Phosphate is generally more easily precipitated from the biologically treated waste stream than the phosphorous containing compound AMPA. For example, in one embodiment, the oxidized AMPA may be contacted with an acidic liquid medium to form a solution comprising at least one inorganic salt (e.g., sodium chloride) and phosphoric acid. Salt crystals may then be precipitated from the salt-containing solution to form an aqueous product mixture comprising salt crystals and a liquor comprising phosphoric acid.

In a further embodiment, a process comprising the steps of biological treatment, followed by oxidation, and finally followed by precipitation, may exhibit enhanced removal of phosphorous from the waste stream.

In certain embodiments wherein the waste stream is contacted with a biological treatment step followed by a precipitant, it is preferred that the precipitant comprise aluminum.

In addition to an increased removal rate of phosphorous, the use of a biological treatment step before subjecting the waste stream to an oxidizing agent and/or precipitant allows for a reduction in the amount of oxidizing agent and/or precipitant needed in the process. This will result in considerable savings in terms of equipment and material costs. For example, reduced size equipment and/or less material will be required. Downstream process efficiencies in terms of processing time may also be achieved.

2. Post-Treatment with Biological Treatment

In certain embodiments of the present invention, the waste stream is subjected to certain treatment mechanism(s) before being subjected to biological treatment. In one embodiment the waste stream is first contacted with an oxidizing agent and/or precipitant, as set forth above, in order to form phosphorus-containing precipitates or a phosphorus-containing cake and an oxidized/precipitant treated waste stream. The oxidized/precipitant treated waste stream may then be subjected to biological treatment to form a biologically treated waste stream. The biological treatment step may be an aerobic biological treatment, anaerobic biological treatment, or a combination thereof. Preferably, the biological treatment is aerobic. The biologically treated waste stream may then be discharged from the treatment process.

The use of an oxidizing step and/or a precipitation step prior to treating the waste stream with a biological treatment system allows for removal of at least a portion of the phosphorous from the waste stream before biological treatment. By first utilizing the step(s) of oxidation and/or precipitation, a phosphorous removal of more than 60% can typically be achieved before treatment with biological treatment. The removal of such a high percentage of the phosphorous allows for a reduction in equipment and material cost related to biologically treating the waste stream. Further, where the oxidizing step and/or a precipitation step produces a treated waste stream satisfying or closely approaching the desired phosphorous content (e.g. satisfying governmental regulations), the need for a biological treatment step can be substantially reduced and/or eliminated. However, in certain embodiments, a biological treatment step may still be incorporated in order to exceed any relevant government regulations.

Advanced Oxidation Process

In certain embodiments, in addition to or in place of the oxidation and/or precipitation step(s), an advanced oxidation process (AOP) may be used. In the context of the present application, an AOP is understood to describe a method of treatment comprising ozone ($O_3$), hydrogen peroxide ($H_2O_2$), and/or UV light. In certain embodiments, the AOP of the present invention comprises contacting a waste stream with a mixture of hydrogen peroxide and goethite ($\alpha$-FeO(OH)). Glyphosate and AMPA can be adsorbed readily by goethite. The phosphonate group binds with goethite by formation of inner sphere complexes, while the carboxylate group remains relatively free from complexation and is available for degradation and/or complexation with metal ions present in the reaction environment. In some embodiments, the AOP may be conducted prior to biological treatment. In other embodiments, the AOP may be conducted after the biological treatment by contacting the biologically treated waste stream with an advanced oxidation process step.

Improved adsorption of glyphosate and AMPA by goethite is observed at pH values of between about 3 and about 6; however, improved adsorption by hydrogen peroxide is observed at pH values of between about 7 and about 8. In certain embodiments, the preferred pH of the AOP is between about 7 and about 8.

The advanced oxidation process may be an exothermic reaction wherein the phosphate containing compounds are reacted to form phosphate ions and the phosphate ions are subsequently precipitated from the stream.

Following the advanced oxidation process, the advanced oxidation components (e.g., hydrogen peroxide and goethite) may be precipitated from the treated stream and recovered for further use and/or appropriate disposal.

In certain embodiments the advanced oxidation process may comprise the use of $H_2O_2$ and $FeSO_4*7H_2O$. Hydrogen peroxide used in the advanced oxidation process may be reported in molar ratios of hydrogen peroxide to moles of organic compounds present in the waste stream to be treated. For example, the advanced oxidation process may comprise the use of from about 10:1 to about 50:1, from about 5:1 to about 40:1, from about 10:1 to about 40:1, from about 10:1 to about 30:1, or from about 10:1 to about 20:1 moles of $H_2O_2$:organics. The advanced oxidation process may comprise the use of from about 50 ppm to about 500 ppm, from about 100 ppm to about 400 ppm, from about 100 ppm to about 300 ppm, from about 150 ppm to about 300 ppm, from about 200 ppm to about 300 ppm, or from about 225 ppm to about 275 ppm $FeSO_4*7H_2O$.

In further embodiments, an oxidation step and/or precipitation step may be performed after the AOP. For example, in one embodiment the waste stream comprising one or more organic phosphorus compounds is subjected to biological treatment to produce a biologically treated waste stream. The biologically treated waste stream is then subjected to the AOP to produce an advanced oxidation treated stream. Finally, the advanced oxidation treated stream is contacted with an oxidizing agent and/or precipitant to form a treated stream that may be discharged from the treatment process.

Fenton Chemistry

In some embodiments, a Fenton reaction may be used in treatment of the waste stream. The Fenton reaction step may be used to replace the precipitation and/or AOP step, or may be a further step in addition to precipitation and/or AOP.

In a Fenton reaction, wherein a source of iron ions is utilized, ferrous iron ions are oxidized by hydrogen peroxide to produce hydroxyl radicals:

$$Fe^{2+}+H_2O_2 \rightarrow Fe^{3+}+OH^-+OH. \quad (1)$$

A second reaction, in which the iron (III) product compound is reduced in the presence of hydrogen peroxide, makes the Fenton reaction catalytic with respect to iron:

$$Fe^{3+}+H_2O_2 \rightarrow Fe^{2+}+H^++HOO. \quad (2)$$

In most environments, reaction (2) is several orders of magnitude slower than reaction (1), and thus becomes the rate-limiting step where an excess of $H_2O_2$ is present.

More generally, other transition metals have also been observed to catalyze reactions similar to the Fenton reaction, wherein transition metal ions react with hydrogen peroxide to produce hydroxyl radicals. For example, the transition metal may be selected from the group consisting of copper, vanadium, chromium, molybdenum, tungsten, manganese, cobalt, nickel, cerium, ruthenium, aluminum, antimony, zinc, titanium, tin, barium, and combinations thereof. Preferably, the transition metal ions are polyvalent. Cobalt is an example of a transition metal known to engage in a Fenton-like reaction with hydrogen peroxide.

Generally, when hydroxyl radicals are produced in the presence of a pesticide (i.e. glyphosate), the pesticide is degraded into reaction products, such as phosphate that do not retain pesticidal activity, and may be precipitated from the waste stream.

In embodiments wherein Fenton chemistry is utilized, it may be desirable for the stream subjected to the Fenton chemistry to have a pH of less than about 10, less than about 9, or less than about 8. The pH may be from about 2 to about 9, from about 3 to about 9, from about 3 to about 8, from about 3 to about 7, or from about 4 to about 7.

Treatment of a Slip-Stream

In certain embodiments, only a portion of the waste stream may be treated with the various treatment mechanisms described above. The portion that is treated may then be recombined with the remainder of the waste stream for further processing.

For example, in one embodiment a portion of the waste stream (e.g., a slip stream) is contacted with a precipitant to produce a precipitant treated slip-stream and phosphorous containing precipitates. The precipitant treated slip-stream is combined with the remainder of the waste stream and subjected to aerobic biological treatment to produce a biologically treated waste stream. The biologically treated waste stream may then be discharged from the treatment process.

In another embodiment, a portion of the waste stream is contacted with an oxidizing agent to produce an oxidized slip-stream and a phosphorous containing cake. The oxidized slip-stream is combined with the remainder of the waste stream and subjected to aerobic biological treatment to produce a biologically treated waste stream. The biologically treated waste stream may then be discharged from the treatment process.

In yet another embodiment, a portion of the waste stream is contacted with an advanced oxidation process to produce an advanced oxidation treated slip-stream and a phosphorous containing cake. The advanced oxidation treated slip-stream is combined with the remainder of the waste stream and subjected to aerobic biological treatment to produce a biologically treated waste stream. The biologically treated waste stream may then be discharged from the treatment process.

In one embodiment of the present invention set forth in FIG. 1, a waste stream comprising organic phosphorus compounds and various other impurities is biologically treated, oxidized, and then contacted with a precipitant. Stream 2 is a waste stream generated in the manufacture of glyphosate and comprising organic phosphorus compounds and various other impurities. Stream 2 is introduced into a biological treatment system 4. The biological treatment system 4 is an aerobic biological treatment system. After biological treatment, the biologically treated waste stream 5 is passed through a solid-liquid separator 6. The solution comprising solid components may be removed as stream 32, passed through sludge tank 36, and dried in drying bed 40, or may be reintroduced into biological treatment system 4 for further processing as shown by streams 34 or 44. The aqueous stream 7, exiting separator 6 is then combined with an oxidizing agent 8. In the embodiment of FIG. 1, the oxidizing agent 8 is bleach. The combined stream is then passed through a vessel 10, comprising an oxidizing chamber 12 and de-oxidizing chamber 14. The contents of vessel 10 flows from chamber 12 into chamber 14, and then is passed through the exit of vessel 10 as stream 18. Sodium sulfite is added to de-oxidizing chamber 14 via stream 16 in order to aid in eliminating excess oxidizing agent present in the stream. The exit stream 18 of vessel 10 is then contacted in vessel 20 with a precipitant 22. After mixing with the precipitant, the exit stream 24 of vessel 20, is passed through a solid-liquid separator 25. The solid components are optionally transferred to a drying bed 40, via line 30. The total dried contents of drying bed 40 may be removed and processed for off-site disposal via line 42. Any liquid resulting from the drying bed may be combined with stream 2 for further processing via line 44. The aqueous stream 26 is removed from solid-liquid separator 25 and optionally passed through a final filtration mechanism 27. For example, filtration mechanism 27 may be a sand filtration system or a centrifuge. Finally, stream 28 is removed from the optional filtration mechanism 27 and may be discharged as a waste stream. Treatment of a waste stream generated in the manufacture of glyphosate comprising organic phosphorus compounds and various other impurities in accordance with the process of FIG. 1 results in a discharge waste stream 28 containing less than 1 ppm phosphorous.

Figure 2:
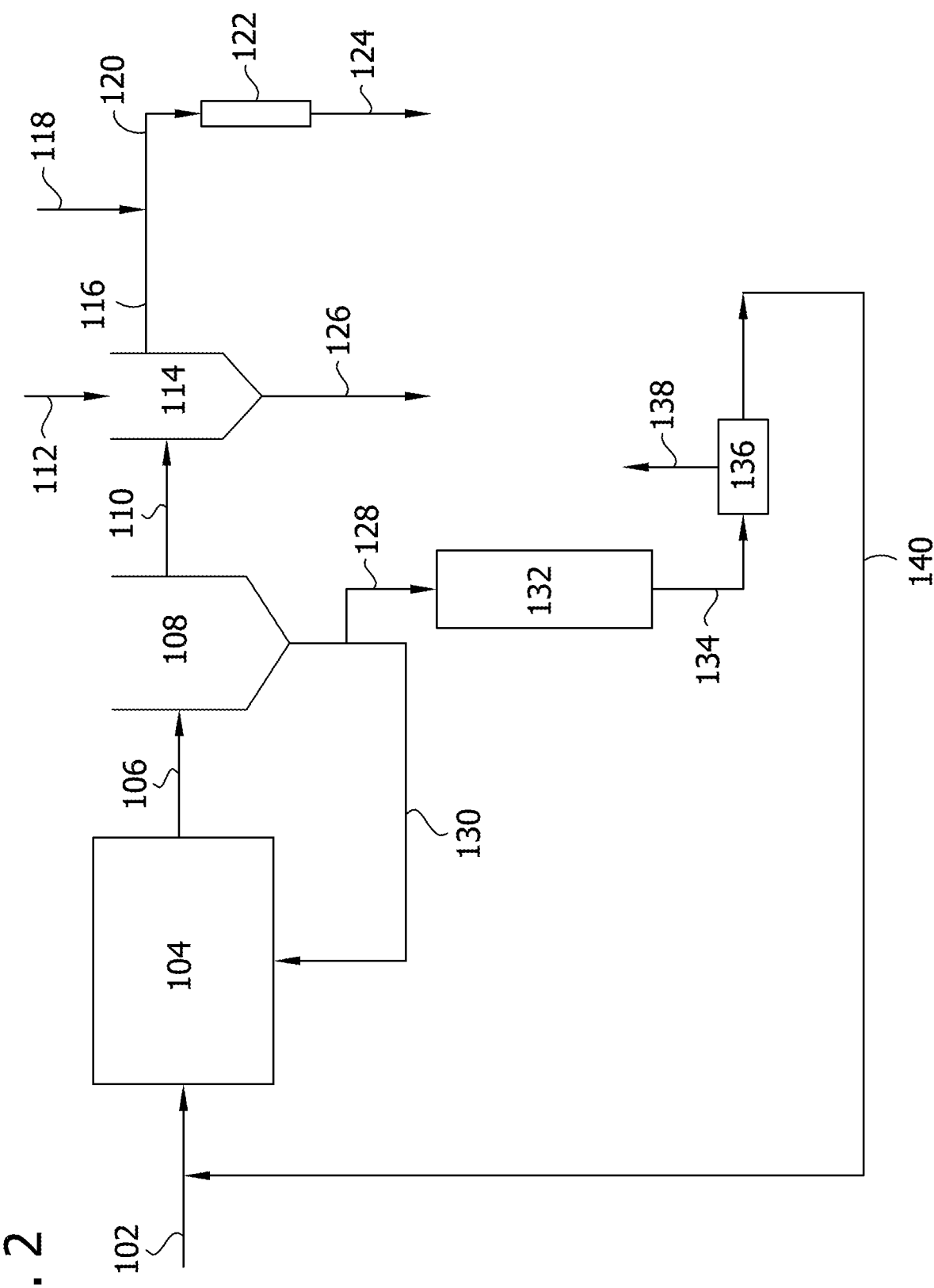
FIG. 2 sets forth the process flow diagram of a waste stream comprising organic phosphorus compounds and various other impurities that is biologically treated, subjected to an advanced oxidation process (AOP), and then contacted with an oxidizing agent as described herein.

In another embodiment, set forth in FIG. 2, a waste stream comprising organic phosphorus compounds and various other impurities is biologically treated, subjected to an advanced oxidation process (AOP), and then contacted with an oxidizing agent. Stream 102 is a waste stream generated in the manufacture of glyphosate comprising organic phosphorus compounds and various other impurities. Stream 102 is introduced into a biological treatment system 104. The biological treatment system 104 is an aerobic biological treatment system. After biological treatment, the biologically treated waste stream 106 is passed through a solid-liquid separator 108. The solution containing solid components may be removed as stream 128, passed through sludge tank 132, and dried in drying bed 136, or may be reintroduced into biological treatments system 104 for further processing via stream 130. The dried solid components of drying bed 136 may be disposed of as a solid waste component via stream 138 and the liquid components of drying bed 136 may be combined with stream 102 for further processing via stream 140. The aqueous stream 110, exiting separator 108 is then contacted with a stream 112 in mixing tank 114. Stream 112 comprises the components of the advanced oxidation process (AOP). In one embodiment, stream 112 comprises a mixture of goethite and $H_2O_2$. The solid components may be removed via stream 126 and disposed of as a solid waste product. The aqueous stream 116 removed from mixing tank 114 is then contacted with an oxidizing agent stream 118 to form an oxidized stream 120. In one embodiment set forth in FIG. 2, the oxidizing agent in stream 118 comprises bleach. The oxidized stream 120 is then optionally subjected to a final filtration mechanism 122. For example, filtration mechanism 122 may be a sand filtration system or centrifuge. Finally, stream 124 is removed from the optional filtration mechanism 122 and may be discharged as a waste stream. Treatment of a waste stream generated in the manufacture of glyphosate comprising organic phosphorus compounds and various other impurities in accordance with the process of FIG. 2 results in a discharge waste stream 124 containing less than 1 ppm phosphorous.

Figure 3:
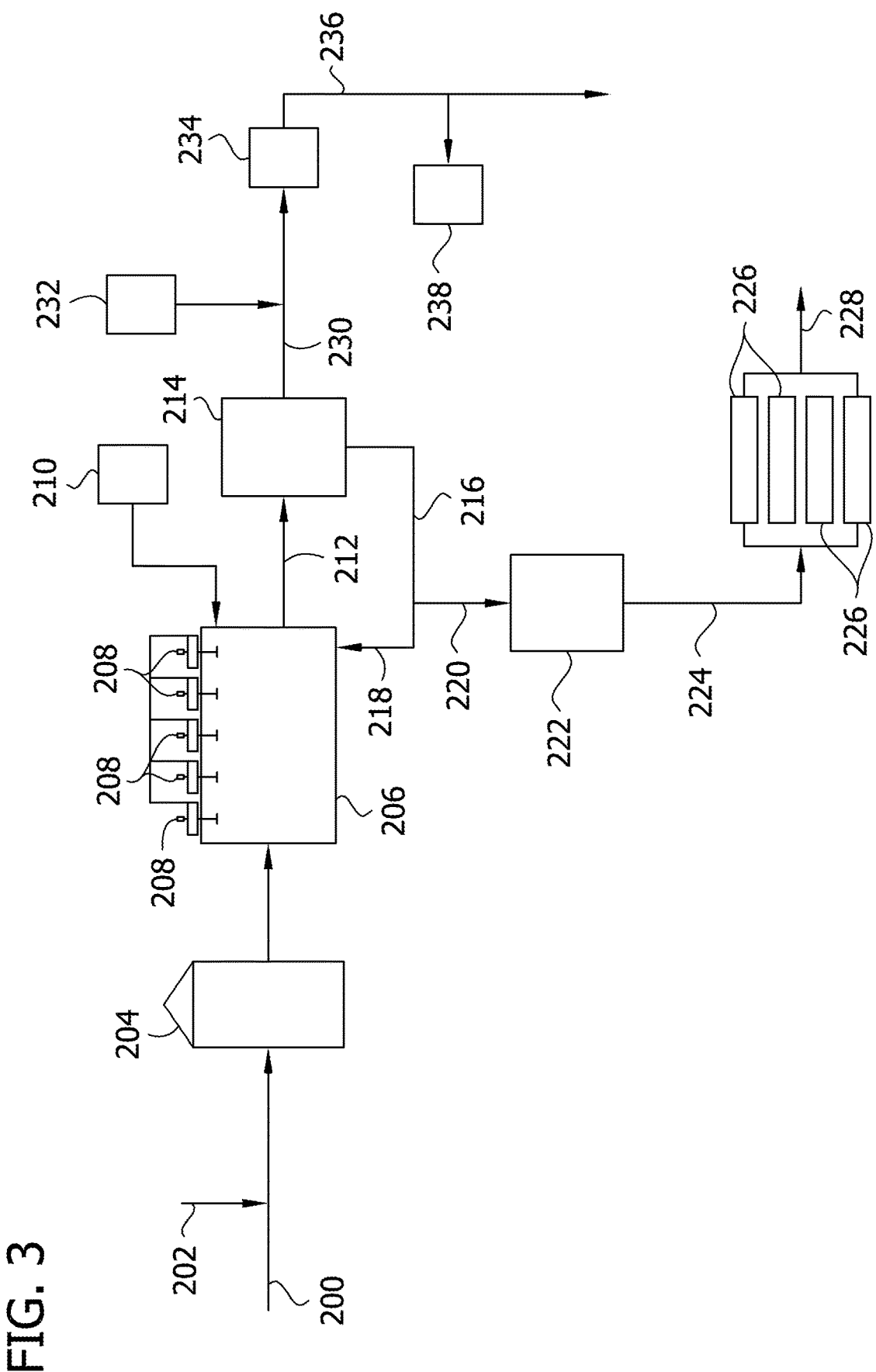
FIG. 3 sets forth the process flow diagram of a waste stream comprising organic phosphorous compounds and various other impurities that is biologically treated and contacted with an oxidizing agent.

In another embodiment, set forth in FIG. 3, a waste stream comprising organic phosphorus compounds and various other impurities is pH balanced, biologically treated, and then contacted with an oxidizing agent. Stream 200 is a waste stream generated in the manufacture of glyphosate comprising organic phosphorus compounds and various other impurities. The pH of stream 200 is optionally adjusted by static mixing with a solution of NaOH 202. Equalization tank 204 forces a residence time for the mixed stream, ensuring that a continuous and homogeneous pH adjusted waste stream is directed from equalization tank 204 to biological treatment tank 206. Biological treatment tank 206 is configured to subject the waste treatment stream to aerobic biological treatment. Biological treatment tank 206 has an operative volume of approximately 5000 $m^3$ and a residence time of approximately 1.7 to 3 days. In order to ensure an efficient biological treatment step, one or more oxygen supply units 208 are connected to the biological treatment tank 206. The oxygen supply unit 208 may be a source of external oxygen or a mechanical mechanism such as a stirrer that ensures aeration. In the embodiment of FIG. 3, the one or more oxygen supply units 208 are mechanical aerators. Also connected to biological treatment tank 206 is a source of additional biological nutrient(s) 210. The amount and composition of the nutrient 210 introduced into biological treatment tank 206 may vary depending upon the specific contents of the biological treatment tank. In order to ensure a more complete biological treatment step, the nutrient 210 may comprise an additional source of chlorine, nitrogen, or phosphorous, as needed. In the embodiment of FIG. 3, the nutrient 210 comprises ferrous chloride. The biological treatment tank 206 may also be connected to a cooling system (not shown) in order to increase biological treatment efficiency. The contents of biological treatment tank 206 are directed to clarifier 214 via stream 212. Clarifier 214 has a volume of approximately 640 $m^3$. A layer of precipitant comprised of microorganisms, organic, and inorganic matter is deposited on the bottom of clarifier 214. The liquid portion present in the clarifier (approximately 60 $m^3$) is removed as stream 230, while the precipitant layer is removed as stream 216. Stream 216 is either directed back to the biological treatment tank 206 for further processing or collected in sludge tank 222, via stream 220. After a sufficient amount of precipitant is collected in sludge tank 222, the contents are directed to drying beds 226 via stream 224. The dying beds 226 may utilize any method known in the art for drying the contents of the precipitant. For example, the drying bed 226 may comprise four drying beds having a total surface area of 250 $m^2$ each. Each drying bed may be comprised of sand and/or stone layers. The drying beds may further comprise a drainage system. The dried precipitant may then be removed and directed via line 228 for disposal or additional use.

Stream 230, upon exiting the clarifier 214, is contacted with an oxidizing agent 232. In the embodiment of FIG. 3, the oxidizing agent is NaClO. After contact with the oxidizing agent the combined stream is passed through oxidation chamber 234 to ensure complete mixing and oxidation. Finally, the contents of the oxidizing chamber 234 may be directed as a waste stream 236 for appropriate disposal. Optionally, a sample chamber 238 may be placed on waste stream 236 to allow for testing of the waste stream. Chamber 238 may be used, for example, to ensure compliance with regulatory agencies and/or emission regulations.

One skilled in the art will understand that various arrangements and modifications can be made to the above mentioned process steps. For example, the process may comprise the steps of oxidation, followed by precipitation, followed by biological treatment. The process may comprise the steps of precipitation, followed by oxidation, followed by biological treatment. The process may comprise the steps of oxidation followed by precipitation. The process may comprise the steps of precipitation followed by oxidation. The process may comprise the steps of oxidation followed by biological treatment. The process may comprise the steps of precipitation followed by biological treatment. Similarly, the process may comprise the steps of biological treatment followed by oxidation. The process may comprise the steps of biological treatment followed by precipitation. The process may comprise the steps of biological treatment, followed by oxidation, followed by precipitation. The process may comprise the steps of biological treatment, followed by precipitation, followed by oxidation. Additionally, any of the processes described above may further comprise an advanced oxidation process step.

Treated Waste Stream

Generally, treatment of a waste stream in accordance with the above process will result in a chemical oxygen demand (COD) of the treated waste stream of no more than about 50,000 ppm, no more than about 40,000 ppm, no more than about 30,000 ppm, no more than about 25,000 ppm, no more than about 20,000 ppm, no more than about 15,000 ppm, no more than about 10,000 ppm, no more than about 5,000 ppm, or no more than about 1,000 ppm. For example, the chemical oxygen demand (COD) of the treated waste stream may be between about 50,000 ppm and about 500 ppm, between about 40,000 ppm and about 500 ppm, between about 30,000 ppm and about 500 ppm, between about 20,000 ppm and about 500 ppm, between about 10,000 ppm and about 500 ppm, between about 5,000 ppm and about 500 ppm, or between about 5,000 ppm and about 1,000 ppm. Likewise, the above process may result in a total COD removal [($COD_{waste\ stream}$−$COD_{treated\ waste\ stream}$)/($COD_{waste\ stream}$)×100] of at least about 50%, at least about 60%, at least about 70%, at least about 75%, at least about 80%, at least about 90%, or at least about 95%.

Further, treatment of a waste stream in accordance with the above process may result in a total phosphorous removal [(weight $P_{waste\ stream}$−weight $P_{treated\ waste\ steam}$)/(weight $P_{waste\ stream}$)×100] of at least about 50%, at least about 60%, at least about 65%, at least about 70%, at least about 75%, at least about 80%, at least about 90%, or at least about 95%.

Regardless of the precise combination of steps/operations, treatment of a waste stream in accordance with the above process may result in a treated waste stream comprising no more than about 3 ppm, no more than about 2 ppm, no more than about 1.5 ppm, no more than about 1.25 ppm, no more than about 1.1 ppm, no more than about 1 ppm, no more than about 0.9 ppm, no more than about 0.8 ppm, no more than about 0.7 ppm, no more than about 0.6 ppm, no more than about 0.5 ppm, no more than about 0.4 ppm, no more than about 0.3 ppm, no more than about 0.25 ppm, no more than about 0.2 ppm, no more than about 0.15 ppm, no more than about 0.1 ppm, or no more than about 0.05 ppm phosphorous.

EXAMPLES

Example 1: Treatment with a Precipitant

Example 1 shows the total phosphorous and chemical oxygen demand (COD) removed for a waste sample contacted with a precipitant ferric chloride ($FeCl_3$). The waste sample contained approximately 27,000 ppm phosphorous and had a starting COD of approximately 67,000 ppm. Two tests were run where the waste sample was contacted with $FeCl_3$ at a ratio of approximately 50 g/L. After treatment with $FeCl_3$, a reduction of phosphorous content of more than 60% was observed. A reduction in COD of more than 40% was also observed. The results are shown below in Table 1.

TABLE 1

| | Volume (L) | T (C) | pH | $FeCl_3$ Dosage (g) | Dried Precipitant (g) | Total P (ppm) | Iron (ppm) | COD (ppm) | Total P Removal % | Total COD Removal % |
|---|---|---|---|---|---|---|---|---|---|---|
| Initial Waste Sample | 0.01 | 24 | 1.56 | | | 27,000 | 10 | 67,000 | | |
| Test 1 | 0.01 | 24 | 4.18 | 0.5 | 1.58 | 9,000 | 265 | 37,000 | 66.26% | 44.78% |
| Test 2 | 0.01 | 24 | 5.07 | 0.5 | 1.59 | 9,700 | 422 | 35,000 | 64.40% | 47.76% |

A precipitant was recovered from the sample after treatment with $FeCl_3$ at a ratio of approximately 159 g of (dried) precipitant per liter of treated waste sample. These results demonstrate that the treatment of a phosphorous containing sample with a precipitant such as $FeCl_3$ results in a significant removal of phosphorous and COD.

Example 2: Treatment with an Oxidizing Agent and Precipitant

Example 2 shows the total phosphorous and COD removed from a waste sample treated by a process first including contact with bleach followed by contact with aluminum sulfate ($Al_2(SO)_4$). Two tests were run utilizing a ratio of 25 g/L and 50 g/L respectively of $Al_2(SO)_4$:waste sample. After treatment with the oxidizing agent (bleach) and precipitant ($Al_2(SO)_4$), a reduction of phosphorous of more than 65% was observed. A reduction in COD of more than 30% was also observed. The results are shown below in Table 2.

TABLE 2

| | Volume (L) | T (C) | pH | Al₂(SO)₄ (g) | Dried Precipitant (g) | Total P (ppm) | Iron (ppm) | COD (ppm) | Total P Removal (%) | COD Removal (%) |
|---|---|---|---|---|---|---|---|---|---|---|
| Initial Waste Sample | 0.01 | 24 | 1.56 | | | 27,000 | 10 | 67,000 | | |
| Test 3 | 0.01 | 24 | 6.9 | 0.25 | 0.22 | 9,900 | 7.2 | 33,000 | 66.26% | 44.78% |
| Test 4 | 0.01 | 24 | 6.9 | 0.50 | 0.58 | 8,300 | 2.4 | 46,000 | 69.36% | 31.34% |

A precipitant was recovered from the sample after treatment with bleach and Al₂(SO)₄ at a ratio of approximately 22 g and 58 g (dried) precipitant per liter of treated waste sample respectively. These results demonstrate that the treatment of a phosphorous containing sample with an oxidizing agent such as bleach and a precipitant such as Al₂(SO)₄ results in the removal of a portion of COD and a significant removal of phosphorous from the waste sample.

Example 3: Precipitant Efficacy Pre-Biological Treatment

Example 3 demonstrates the ability of a precipitant (FeCl₃) to remove considerable amounts of phosphorous from a waste treatment stream prior to being subjected to biological treatment. The tested waste stream contained 147.3 ppm phosphorous at a pH of 2.74. The pH of the waste stream was optionally increased prior to treatment and an amount of 0.5 g/L and 0.75 g/L FeCl₃ was used to treat the stream.

TABLE 3

| pH Prior to Treatment with FeCl₃ | FeCl₃ Dosage (g/L) | Total Initial P (ppm) | Total P After Treatment (ppm) | Total P Removal (%) | pH After Treatment With FeCl₃ |
|---|---|---|---|---|---|
| 2.74 | 0.5 | 147.3 | 43.41 | 70.53% | 2.37 |
| 3.99 | 0.5 | 147.3 | 46.27 | 68.59% | 3.73 |
| 4.99 | 0.5 | 147.3 | 76.82 | 47.85% | 4.26 |

TABLE 4

| pH Prior to Treatment with FeCl₃ | FeCl₃ Dosage (g/L) | Total Initial P (ppm) | Total P After Treatment (ppm) | Total P Removal (%) | pH After Treatment With FeCl₃ |
|---|---|---|---|---|---|
| 2.74 | 0.75 | 147.3 | 45.46 | 69.14% | 2.16 |
| 3.99 | 0.75 | 147.3 | 20.28 | 86.23% | 3.63 |
| 5.07 | 0.75 | 147.3 | 18.25 | 87.61% | 4.13 |

Example 4: Precipitant Efficacy Post-Biological Treatment

Example 4 demonstrates the ability of a precipitant (e.g., CaO) to remove considerable amounts of phosphorus after the waste treatment stream has been subjected to biological treatment. In each dosage, as set forth in Table 5 below, the pH of the biologically treated stream was maintained at about 8.1 prior to contact with the precipitant. The pH of the waste stream after treatment with the precipitant can be seen below. Table 5 demonstrates that nearly 70% of the phosphorous may be removed from a biologically treated stream by contacting the biologically treated stream at a rate of 1.15 g/L.

TABLE 5

| CaO Dosage (g/L) | Total Initial P (ppm) | Total P After Treatment (ppm) | P Removal (%) | pH After Treatment With CaO |
|---|---|---|---|---|
| 0.11 | 42.16 | 24.55 | 41.8% | 8.99 |
| 0.23 | 42.16 | 18.96 | 55.0% | 9.47 |
| 0.57 | 42.16 | 18.2 | 56.8% | 11.60 |
| 1.15 | 42.16 | 12.7 | 69.9% | 12.20 |

Example 5: Treatment of a Waste Stream with an Oxidizing Agent and Precipitant Assays were conducted with a waste stream utilizing an oxidizing agent (NaClO) and a precipitant PAC-18 (18% polyaluminum chloride). A constant amount of oxidizing agent was used in each experiment while varying the amount of precipitant (PAC-18). Amounts of sodium hypochlorite and PAC-18 used in the below experiments are reported in dosage amounts of parts per million (ppm).

Each assay was measured to determine the phosphorous content before treatment. The oxidizing agent (sodium hypochlorite) was added to the assay and allowed to react for 45 minutes. A reducing agent/neutralizing agent (e.g., bisulfate) was added to eliminate any excess oxidizing agent present in the assay. Finally the precipitant (PAC-18) was added. After the precipitant was added, the total phosphorous content of the assay was measured.

The below tests demonstrate the relative effect of increased treatment amounts of oxidizing agent and precipitant, as well as the pH vale of each assay after treatment. Where no pH value is provided, a measurement was not recorded. For each test, the phosphorous content of the waste stream prior to treatment is as set forth in the title.

TABLE 6

Test 1: Untreated Waste Stream - Initial Phosphorous Content 141 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 1000 | 36 | — | 1000 | 33 | — | 1000 | 35 | — |
| 1500 | 10.5 | — | 1500 | 10 | — | 1500 | 12 | — |
| 2000 | 4.2 | 6.7 | 2000 | 3.8 | — | 2000 | 3.8 | — |
| 2500 | 3.6 | 6.5 | 2500 | 3.2 | 6.6 | 2500 | 3.4 | — |
| 3000 | 2.2 | 6.3 | 3000 | 2 | 6.45 | 3000 | 2.1 | 6.6 |
| 3500 | 2 | 6.1 | 3500 | 1.9 | 6.3 | 3500 | 2 | 6.5 |
| 4000 | 2.1 | 5.8 | 4000 | 1.7 | 6.1 | 4000 | 1.9 | 6.3 |
| 5000 | 2.5 | — | 5000 | 2 | 5.8 | 5000 | 2 | 5.9 |

TABLE 7

Test 2: Untreated Waste Stream - Initial Phosphorous Content 54 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 1000 | 27 | — | 1000 | 28 | — | | | — |
| 1500 | 10.2 | — | 1500 | 11.2 | — | | | — |
| 2000 | 4.5 | 6.6 | 2000 | 4.7 | — | 2000 | 4.8 | 6.8 |
| 2500 | 3.4 | 6.48 | 2500 | 3.6 | — | 2500 | 3.5 | — |
| 3000 | 1.6 | 6.42 | 3000 | 1.7 | 6.51 | 3000 | 1.6 | 6.5 |
| 3200 | 1.1 | 6.35 | 3200 | 1.3 | 6.45 | 3200 | 1.4 | 6.45 |
| 3500 | 0.88 | 6.27 | 3500 | 0.96 | 6.4 | 3500 | 1.1 | 6.42 |
| 3750 | 1 | — | 3750 | 0.87 | 6.33 | 3750 | 0.9 | 6.37 |

TABLE 8

Test 3: Untreated Waste Stream - Initial Phosphorous Content 51 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 2000 | 4.3 | — | 2000 | 4.5 | — | 2000 | 4.6 | — |
| 2500 | 3.3 | — | 2500 | 3.2 | 6.48 | 2500 | 3.3 | 6.55 |
| 3000 | 1.1 | 6.35 | 3000 | 1.05 | 6.42 | 3000 | 1.2 | 6.46 |
| 3200 | 0.9 | 6.32 | 3200 | 0.96 | 6.38 | 3200 | 0.98 | 6.45 |
| 3500 | 0.75 | 6.25 | 3500 | 0.8 | 6.32 | 3500 | 0.83 | 6.37 |
| 3750 | 0.8 | — | 3750 | 0.73 | 6.25 | 3750 | 0.75 | — |

TABLE 9

Test 4: Untreated Waste Stream - Initial Phosphorous Content 49 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 2000 | 3.6 | 6.49 | 2000 | 3.5 | — | 2000 | 3.4 | 6.6 |
| 2500 | 2.7 | 6.43 | 2500 | 2.9 | — | 2500 | 2.7 | 6.54 |
| 3000 | 1 | 6.38 | 3000 | 1.1 | — | 3000 | 1.05 | 6.45 |
| 3200 | 0.87 | 6.31 | 3200 | 0.9 | 6.34 | 3200 | 0.92 | 6.37 |
| 3500 | 0.83 | 6.24 | 3500 | 0.83 | 6.3 | 3500 | 0.86 | 6.32 |

TABLE 10

Test 5: Untreated Waste Stream - Initial Phosphorous Content 46 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 2000 | 3.1 | — | 2000 | 3.3 | — | 2000 | 3.3 | — |
| 2500 | 2.2 | 6.4 | 2500 | 2.3 | 6.43 | 2500 | 2.4 | 6.44 |
| 3000 | 0.9 | 6.35 | 3000 | 0.95 | 6.37 | 3000 | 0.97 | 6.39 |
| 3200 | 0.78 | 6.3 | 3200 | 0.8 | 6.32 | 3200 | 0.84 | 6.35 |

TABLE 11

Test 6: Untreated Waste Stream - Initial Phosphorous Content 51 mg/l

| Precipitant only | | | 10 PPM NaClO + Precipitant | | | 15 PPM NaClO + Precipitant | | |
|---|---|---|---|---|---|---|---|---|
| PAC (PPM) | Total P (mg/l) | pH | PAC (PPM) | Total P (mg/l) | pH | PAC (PPM) | Total P (mg/l) | pH |
| 2000 | 4.2 | 6.55 | 2000 | 4.4 | — | 2000 | 4.5 | — |
| 2500 | 3.1 | 6.48 | 2500 | 3.2 | 6.45 | 2500 | 3.2 | 6.5 |
| 3000 | 1 | 6.38 | 3000 | 1.1 | 6.42 | 3000 | 1.1 | 6.43 |
| 3200 | 0.83 | 6.33 | 3200 | 0.88 | 6.36 | 3200 | 0.9 | 6.38 |

Example 6: Treatment of a Waste Stream with an Advanced Oxidation Process

Assays were conducted with a waste stream wherein the waste stream was treated with hydrogen peroxide and iron sulfate. A constant volume of hydrogen peroxide was used in each experiment while varying the amount of precipitant (iron sulfate).

The waste stream was contacted with a volume of hydrogen peroxide for about 40 minutes to allow for oxidation of phosphorous containing compounds and further organic compounds present in the stream. The waste stream was then contacted with the precipitant ($FeSO_4 * 7H_2O$).

Molar ratios of hydrogen peroxide to total organics present in the waste stream to be treated were measured. For example, experiments utilizing "10:1 Mol $H_2O_2$" used a total molar amount of hydrogen peroxide of ten times the molar amount of organics present in the waste stream to be treated. That is, a value of "10:1 $H_2O_2$" represents a 10:1 molar ratio of hydrogen peroxide to total organic compounds. The amount of iron sulfate ($FeSO_4 * 7H_2O$) used was reported in dosage amounts of parts per million (ppm).

The below experiments demonstrate the relative effect of increased treatment amounts of hydrogen peroxide and precipitant, as well as the pH value of each assay after treatment. For each test, the phosphorous content of the waste stream prior to treatment is as set forth in the title.

TABLE 12

Test 1: Untreated Waste Stream - Initial Phosphorous Content 141 mg/l

| 10:1 $H_2O_2$ | | | 20:1 $H_2O_2$ | | | 40:1 $H_2O_2$ | | |
|---|---|---|---|---|---|---|---|---|
| $FeSO_4 * 7H_2O$ dose (PPM) | Total P (mg/l) | pH | $FeSO_4 * 7H_2O$ dose (PPM) | Total P (mg/l) | pH | $FeSO_4 * 7H_2O$ dose (PPM) | Total P (mg/l) | pH |
| 100 | 38 | 6.5 | 100 | 38 | 6.48 | 100 | 37 | 6.47 |
| 150 | 35 | 6.3 | 150 | 35 | 6.33 | 150 | 36 | 6.35 |
| 200 | 31 | 6.1 | 200 | 33 | 6.12 | 200 | 32 | 6.15 |
| 250 | 28 | 5.8 | 250 | 28.5 | 5.78 | 250 | 29 | 5.8 |
| 300 | 22 | 5.4 | 300 | 21 | 5.35 | 300 | 22 | 5.33 |
| 350 | 24 | 5.1 | 350 | 23 | 5.08 | 350 | 24 | 5.1 |

TABLE 13

Test 2: Untreated Waste Stream - Initial Phosphorous Content 54 mg/l

| 10:1 $H_2O_2$ | | | 20:1 $H_2O_2$ | | | 40:1 $H_2O_2$ | | |
|---|---|---|---|---|---|---|---|---|
| $FeSO_4 * 7H_2O$ dose (PPM) | Total P (mg/l) | pH | $FeSO_4 * 7H_2O$ dose (PPM) | Total P (mg/l) | pH | $FeSO_4 * 7H_2O$ dose (PPM) | Total P (mg/l) | pH |
| 100 | 24 | 6.55 | 100 | 23 | 6.6 | 100 | 24 | 6.62 |
| 150 | 21 | 6.48 | 150 | 21 | 6.55 | 150 | 21 | 6.6 |

TABLE 13-continued

Test 2: Untreated Waste Stream - Initial Phosphorous Content 54 mg/l

| 10:1 $H_2O_2$ | | | 20:1 $H_2O_2$ | | | 40:1 $H_2O_2$ | | |
|---|---|---|---|---|---|---|---|---|
| $FeSO_4*7H_2O$ dose (PPM) | Total P (mg/l) | pH | $FeSO_4*7H_2O$ dose (PPM) | Total P (mg/l) | pH | $FeSO_4*7H_2O$ dose (PPM) | Total P (mg/l) | pH |
| 200 | 16 | 6.4 | 200 | 15 | 6.43 | 200 | 15 | 6.48 |
| 250 | 12 | 6.33 | 250 | 11 | 6.31 | 250 | 11 | 6.37 |
| 300 | 15 | 6.18 | 300 | 14 | 6.22 | 300 | 12 | 6.28 |
| 350 | 18 | 6.04 | 350 | 16 | 6.1 | 350 | 15 | 6.05 |

TABLE 14

Test 3: Untreated Waste Stream - Initial Phosphorous Content 51 mg/l

| 10:1 $H_2O_2$ | | | 20:1 $H_2O_2$ | | | 40:1 $H_2O_2$ | | |
|---|---|---|---|---|---|---|---|---|
| $FeSO_4*7H_2O$ dose (PPM) | Total P (mg/l) | pH | $FeSO_4*7H_2O$ dose (PPM) | Total P (mg/l) | pH | $FeSO_4*7H_2O$ dose (PPM) | Total P (mg/l) | pH |
| 100 | 20 | 7 | 100 | 19 | 6.98 | 100 | 20 | 6.94 |
| 150 | 17 | 6.8 | 150 | 16 | 6.75 | 150 | 18 | 6.7 |
| 200 | 13 | 6.48 | 200 | 12 | 6.42 | 200 | 14 | 6.35 |
| 250 | 12 | 6.38 | 250 | 11 | 6.35 | 250 | 12 | 6.3 |
| 275 | 12 | 6.3 | 275 | 12 | 6.27 | 300 | 13 | 6.24 |
| 300 | 13 | 6.13 | 300 | 13 | 6.09 | 350 | 14 | 6.02 |

TABLE 15

Test 4: Untreated Waste Stream - Initial Phosphorous Content 49 mg/l

| 10:1 $H_2O_2$ | | | 20:1 $H_2O_2$ | | | 40:1 $H_2O_2$ | | |
|---|---|---|---|---|---|---|---|---|
| $FeSO_4*7H_2O$ dose (PPM) | Total P (mg/l) | pH | $FeSO_4*7H_2O$ dose (PPM) | Total P (mg/l) | pH | $FeSO_4*7H_2O$ dose (PPM) | Total P (mg/l) | pH |
| 100 | 16 | 6.9 | 100 | 16 | 6.88 | 100 | 15 | 6.9 |
| 150 | 14 | 6.73 | 150 | 15 | 6.72 | 150 | 14 | 6.68 |
| 200 | 12 | 6.51 | 200 | 12 | 6.48 | 200 | 11 | 6.35 |
| 250 | 9.8 | 6.38 | 250 | 10 | 6.33 | 250 | 9.8 | 6.29 |
| 275 | 9.6 | 6.3 | 275 | 9.7 | 6.28 | 300 | 10 | 6.24 |
| 300 | 9.9 | 6.22 | 300 | 9.8 | 6.2 | 350 | 11 | 6.16 |

TABLE 16

Test 5: Untreated Waste Stream - Initial Phosphorous Content 46 mg/l

| 10:1 $H_2O_2$ | | | 20:1 $H_2O_2$ | | | 40:1 $H_2O_2$ | | |
|---|---|---|---|---|---|---|---|---|
| $FeSO_4*7H_2O$ dose (PPM) | Total P (mg/l) | pH | $FeSO_4*7H_2O$ dose (PPM) | Total P (mg/l) | pH | $FeSO_4*7H_2O$ dose (PPM) | Total P (mg/l) | pH |
| 100 | 12 | 6.9 | 100 | 11.5 | 6.87 | 100 | 12 | 6.9 |
| 150 | 10 | 6.62 | 150 | 9.9 | 6.65 | 150 | 11 | 6.67 |
| 200 | 8.6 | 6.44 | 200 | 8.4 | 6.38 | 200 | 9.6 | 6.4 |
| 250 | 5.3 | 6.32 | 250 | 5.1 | 6.3 | 250 | 7.3 | 6.3 |
| 275 | 5.5 | 6.25 | 275 | 5.4 | 6.25 | 300 | 6.2 | 6.26 |
| 300 | 6.2 | 6.18 | 300 | 6.1 | 6.18 | 350 | 6.6 | 6.18 |

TABLE 17

Test 6: Untreated Waste Stream - Initial Phosphorous Content 51 mg/l

| 10:1 $H_2O_2$ | | | 20:1 $H_2O_2$ | | | 40:1 $H_2O_2$ | | |
|---|---|---|---|---|---|---|---|---|
| $FeSO_4*7H_2O$ dose (PPM) | Total P (mg/l) | pH | $FeSO_4*7H_2O$ dose (PPM) | Total P (mg/l) | pH | $FeSO_4*7H_2O$ dose (PPM) | Total P (mg/l) | pH |
| 100 | 14 | 6.98 | 100 | 15 | 7 | 100 | 15 | 6.98 |
| 150 | 11 | 6.8 | 150 | 12 | 6.82 | 150 | 12 | 6.83 |
| 200 | 9.1 | 6.53 | 200 | 10 | 6.6 | 200 | 9.8 | 6.66 |
| 250 | 6.8 | 6.37 | 250 | 7.1 | 6.4 | 250 | 6.9 | 6.43 |
| 275 | 5.8 | 6.33 | 275 | 6.3 | 6.37 | 300 | 6.3 | 6.35 |
| 300 | 6.1 | 6.21 | 300 | 6.1 | 6.29 | 350 | 6.5 | 6.32 |

It was determined that the molar amount of hydrogen peroxide used to oxidize the waste stream had minimal effect on the overall removal rate of phosphorous. As set forth in the above results, at a specific rate of precipitant, an increase of the hydrogen peroxide of even four times (i.e., 10:1 $H_2O_2$ vs. 40:1 $H_2O_2$) resulted in comparable results.

Example 7: Optimized Treatment Rates

A further experiment was performed to determine the optimal amount of treatment material for each waste stream.

Table 18 shows the optimum values for treatment of a waste stream with only the precipitant PAC-18 (18% polyaluminum chloride). In the below table TSS stands for total suspended solids.

TABLE 18

| | Prior to Treatment | | After Precipitant Treatment | | | | |
|---|---|---|---|---|---|---|---|
| | Total Phosphorus (mg/l) | pH | PAC dose (PPM) | Total P (mg/l) | pH | TSS (mg/l) | Total P Removal |
| Sample 1 | 141 | 7.6 | 3000 | 2.2 | 6.3 | 2430 | 98.4% |
| Sample 2 | 54 | 7.6 | 3500 | 0.88 | 6.27 | 1370 | 98.4% |
| Sample 3 | 51 | 7.7 | 3200 | 0.9 | 6.32 | 1460 | 98.2% |
| Sample 4 | 49 | 7.5 | 3200 | 0.87 | 6.31 | 1310 | 98.2% |
| Sample 5 | 46 | 7.4 | 3000 | 0.9 | 6.35 | 1200 | 98.0% |
| Sample 6 | 51 | 7.6 | 3000 | 1 | 6.38 | 1400 | 98.0% |

Table 19 demonstrates the optimum values for treatment of a waste stream with an oxidizing agent (NaClO) and a precipitant PAC-18 (18% polyaluminum chloride).

Each sample was measured to determine the phosphorous content before treatment. The oxidizing agent (sodium hypochlorite) was added to the sample and allowed to react for 45 minutes. A reducing agent/neutralizing agent (e.g., bisulfate) was added to eliminate any excess oxidizing agent present in the sample. Finally the precipitant (i.e. PAC-18) was added. After the precipitant was added, the total phosphorous content of the sample was measured.

TABLE 19

| | Prior to Treatment | | After Treatment: 10 PPM NaClO + Precipitant | | | | |
|---|---|---|---|---|---|---|---|
| | Total Phosphorus (mg/l) | pH | PAC dose (PPM) | Total P (mg/l) | pH | TSS (mg/l) | Total P Removal |
| Sample 1 | 141 | 7.6 | 3000 | 2 | 6.45 | 2340 | 98.6% |
| Sample 2 | 54 | 7.6 | 3500 | 0.96 | 6.4 | 1340 | 98.2% |
| Sample 3 | 51 | 7.7 | 3200 | 0.96 | 6.38 | 1450 | 98.1% |

TABLE 19-continued

| | Prior to Treatment | | After Treatment: 10 PPM NaClO + Precipitant | | | | |
|---|---|---|---|---|---|---|---|
| | Total Phosphorus (mg/l) | pH | PAC dose (PPM) | Total P (mg/l) | pH | TSS (mg/l) | Total P Removal |
| Sample 4 | 49 | 7.5 | 3200 | 0.9 | 6.34 | 1300 | 98.2% |
| Sample 5 | 46 | 7.4 | 3000 | 0.95 | 6.37 | 1170 | 97.9% |
| Sample 6 | 51 | 7.6 | 3000 | 1.1 | 6.42 | 1370 | 97.8% |

Table 20 demonstrates the optimum value for treatment of a waste stream with hydrogen peroxide and iron sulfate.

The sample was contacted with a molar ratio of hydrogen peroxide to total organic compounds of 10:1 for about 40 minutes to allow for oxidation of phosphorous containing compounds and further organic compounds present in the stream. The sample was then contacted with the precipitant ($FeSO_4 \cdot 7H_2O$).

Amounts of hydrogen peroxide were measured as above, in relation to the molar amount of organic compounds in the waste stream to be treated. That is, a value of "10:1 $H_2O_2$" represents a 10:1 molar ratio of hydrogen peroxide to total organic compounds.

TABLE 20

| | Prior to Treatment | | After Treatment: 10:1 $H_2O_2$ + $FeSO_4 \cdot 7H_2O$ | | | | |
|---|---|---|---|---|---|---|---|
| | Total Phosphorus (mg/l) | pH | $FeSO_4 \cdot 7H_2O$ dose | Total P (mg/l) | pH | TSS (mg/l) | Total P removal |
| Sample 1 | 141 | 7.6 | 300 | 22 | 5.4 | 1860 | 84.4% |
| Sample 2 | 54 | 7.6 | 250 | 12 | 6.33 | 1430 | 77.8% |
| Sample 3 | 51 | 7.7 | 200 | 13 | 6.48 | 1400 | 74.5% |
| Sample 4 | 49 | 7.5 | 250 | 9.8 | 6.38 | 1310 | 80.0% |
| Sample 5 | 46 | 7.4 | 250 | 5.3 | 6.32 | 1250 | 88.5% |
| Sample 6 | 51 | 7.6 | 250 | 6.8 | 6.37 | 1290 | 86.7% |

EMBODIMENTS

Embodiment A1 is a process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

subjecting at least a portion of the waste stream comprising one or more organic phosphorus compounds and phosphate ($PO_4^{3-}$) to biological treatment to form a biologically treated waste stream;

contacting the biologically treated waste stream with a precipitant, thereby forming within the biologically treated waste stream phosphate containing precipitates, wherein the biologically treated waste stream has a pH of less than 7 when initially contacted with the precipitant; and recovering a phosphate containing cake from the biologically treated waste stream, thereby forming a treated waste stream.

Embodiment A2 is a process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

subjecting at least a portion of the waste stream comprising one or more organic phosphorus compounds and phosphate ($PO_4^{3-}$) to biological treatment to form a biologically treated waste stream;

contacting the biologically treated waste stream with an oxidizing agent to form an oxidized treated waste stream;

contacting the oxidized treated waste stream with a precipitant, thereby forming within the oxidized treated waste stream phosphate containing precipitates; and recovering a phosphate containing cake from the oxidized treated waste stream, thereby forming a treated waste stream.

Embodiment A3 is the process as set forth in embodiment A2 wherein the oxidizing agent is selected from the group consisting of calcium hypochlorite, sodium hypochlorite, bleach, and combinations thereof.

Embodiment A4 is the process as set forth in embodiment A2 or A3 wherein the oxidizing agent is bleach.

Embodiment A5 is the process as set forth in any one of embodiments A2 to A4 wherein the biologically treated waste stream prior to contact with the oxidizing agent has a pH of from about 1 to about 7.5, from about 1.5 to about 7, from about 2 to about 6.5, from about 2.3 to about 6.5, from about 2.5 to about 6, from about 3 to about 5.5, or from about 3.5 to about 5.

Embodiment A6 is the process as set forth in any one of embodiments A2 to A5 wherein the biologically treated waste stream is contacted with an oxidizing agent for at least about 15 minutes, at least about 30 minutes, at least about 45 minutes, at least about 1 hour, at least about 1.5 hours, at least about 2 hours, or at least about 3 hours.

Embodiment A7 is the process as set forth in any one of embodiments A2 to A6 wherein the molar ratio of oxidizing agent to glyphosate present in the biologically treated waste stream is at least about 1:1, at least about 2:1, at least about 3:1, at least about 5:1, at least about 10:1, or at least about 15:1.

Embodiment A8 is the process as set forth in any one of embodiments A2 to A6 wherein the molar ratio of oxidizing agent to AMPA present in the biologically treated waste stream is at least about 1:1, at least about 2:1, at least about 3:1, at least about 5:1, at least about 10:1, or at least about 15:1.

Embodiment A9 is the process as set forth in any one of embodiments A1 to A8 wherein the biological treatment is conducted under aerobic conditions.

Embodiment A10 is the process as set forth in any one of embodiments A1 to A9 wherein the biological treatment is conducted at a temperature of from about 15° C. to about 45° C., from about 20° C. to about 40° C., from about 25° C. to about 40° C., or from about 30° C. to about 35° C.

Embodiment A11 is the process as set forth in any one of embodiments A1 to A10 wherein the pH of the biologically treated waste stream is less than about 6, less than about 5, less than about 4, less than about 3, or less than about 2.

Embodiment A12 is the process as set forth in any one of embodiments A1 to A11 wherein the precipitant comprises a metal selected from the group consisting of calcium, aluminum, iron, magnesium, and mixtures thereof.

Embodiment A13 is the process as set forth in embodiment A12 wherein the precipitant comprises aluminum.

Embodiment A14 is the process as set forth in embodiment A12 wherein the precipitant is selected from the group consisting of $FeCl_3$, $Al_2(SO_4)_3$, CaO, and combinations thereof.

Embodiment A15 is the process as set forth in embodiment A14 wherein the precipitant is $Al_2(SO_4)_3$.

Embodiment A16 is the process as set forth in any one of embodiments A1 to A15 wherein the biologically treated waste stream and/or oxidized treated waste stream is contacted with the precipitant at a rate of from about 0.05 g/l to about 2 g/l, from about 0.1 g/l to about 1.75 g/l, from about 0.1 g/l to about 1.5 g/l, from about 0.1 g/l to about 1.25 g/l, or from about 0.1 g/l to about 1.15 g/l.

Embodiment A17 is the process as set forth in any one of embodiments A1 to A15 wherein the biologically treated waste stream and/or oxidized treated waste stream is contacted with the precipitant at a weight ratio of precipitant to oxidizing agent of from about 50:1 to about 500:1, from about 100:1 to about 500:1, from about 200:1 to about 400:1, from about 250:1 to about 300:1, or from about 275:1 to about 300:1.

Embodiment A18 is the process as set forth in any one of embodiments A1 to A17 wherein the treated waste stream comprises no more than about 3 ppm, no more than about 2 ppm, no more than about 1.5 ppm, no more than about 1.25 ppm, no more than about 1.1 ppm, no more than about 1 ppm, no more than about 0.9 ppm, no more than about 0.8 ppm, no more than about 0.7 ppm, no more than about 0.6 ppm, no more than about 0.5 ppm, no more than about 0.4 ppm, no more than about 0.3 ppm, no more than about 0.25 ppm, no more than about 0.2 ppm, no more than about 0.15 ppm, no more than about 0.1 ppm, or no more than about 0.05 ppm phosphorous.

Embodiment A19 is the process as set forth in any one of embodiments A1 to A18 wherein the chemical oxygen demand (COD) of the treated waste stream is no more than about 50,000 ppm, no more than about 40,000 ppm, no more than about 30,000 ppm, no more than about 25,000 ppm, no more than about 20,000 ppm, no more than about 15,000 ppm, no more than about 10,000 ppm, no more than about 5,000 ppm, or no more than about 1,000 ppm.

Embodiment A20 is the process as set forth in any one of embodiments A1 to A18 wherein the chemical oxygen demand (COD) of the treated waste stream is between about 50,000 ppm and about 500 ppm, between about 40,000 ppm and about 500 ppm, between about 30,000 ppm and about 500 ppm, between about 20,000 ppm and about 500 ppm, between about 10,000 ppm and about 500 ppm, between about 5,000 ppm and about 500 ppm, or between about 5,000 ppm and about 1,000 ppm.

Embodiment A21 is the process as set forth in any one of embodiments A1 to A20 wherein the total phosphorous removal [(weight $P_{waste\ stream}$−weight $P_{treated\ waste\ stream}$)/(weight $P_{waste\ stream}$)×100] is at least about 50%, at least about 60%, at least about 65%, at least about 70%, at least about 75%, at least about 80%, at least about 90%, or at least about 95%.

Embodiment A22 is the process as set forth in any one of embodiments A1 to A21 wherein the total COD removal [($COD_{waste\ stream}$−$COD_{treated\ waste\ stream}$)/($COD_{waste\ stream}$)×100] is at least about 50%, at least about 60%, at least about 70%, at least about 75%, at least about 80%, at least about 90%, or at least about 95%.

Embodiment A23 is a process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

contacting at least a portion of the waste stream comprising one or more organic phosphorus compounds and phosphate ($PO_4^{3-}$) with a precipitant, thereby forming within the waste stream phosphate containing precipitates, to produce a precipitant treated stream, wherein the waste stream has a pH of less than 7 when initially contacted with the precipitant;

subjecting at least a portion of the precipitant treated stream to biological treatment to form a biologically treated waste stream; and recovering a phosphate containing cake from the biologically treated waste stream, thereby forming a treated waste stream.

Embodiment A24 is the process as set forth in embodiment A23 wherein at least a portion of the waste stream comprising one or more organic phosphorus compounds and phosphate ($PO_4^{3-}$) is contacted with an oxidizing agent prior to contact with a precipitant, to form an oxidized treated stream and thereby oxidizing at least one organic phosphorus compound to form phosphate ($PO_4^3$), and wherein the oxidized treated stream is contacted with the precipitant.

Embodiment A25 is the process as set forth in embodiment A24 wherein the oxidizing agent is selected from the group consisting of calcium hypochlorite, sodium hypochlorite, bleach, and combinations thereof.

Embodiment A26 is the process as set forth in embodiment A24 or A25 wherein the oxidizing agent is bleach.

Embodiment A27 is the process as set forth in any one of embodiments A24 to A26 wherein the waste stream prior to contact with the oxidizing agent has a pH of from about 1 to about 7.5, from about 1.5 to about 7, from about 2 to about 6.5, from about 2.3 to about 6.5, from about 2.5 to about 6, from about 3 to about 5.5, or from about 3.5 to about 5.

Embodiment A28 is the process as set forth in any one of embodiments A24 to A27 wherein the waste stream is contacted with an oxidizing agent for at least about 15 minutes, at least about 30 minutes, at least about 45 minutes, at least about 1 hour, at least about 1.5 hours, at least about 2 hours, or at least about 3 hours.

Embodiment A29 is the process as set forth in any one of embodiments A24 to A28 wherein the molar ratio of oxidizing agent to glyphosate present in the waste stream is at least about 1:1, at least about 2:1, at least about 3:1, at least about 5:1, at least about 10:1, or at least about 15:1.

Embodiment A30 is the process as set forth in any one of embodiments A24 to A28 wherein the molar ratio of oxidizing agent to AMPA present in the waste stream is at least about 1:1, at least about 2:1, at least about 3:1, at least about 5:1, at least about 10:1, or at least about 15:1.

Embodiment A31 is the process as set forth in any one of embodiments A23 to A30 wherein the biological treatment is conducted under aerobic conditions.

Embodiment A32 is the process as set forth in any one of embodiments A23 to A31 wherein the biological treatment is conducted at a temperature of from about 15° C. to about 45° C., from about 20° C. to about 40° C., from about 25° C. to about 40° C., or from about 30° C. to about 35° C.

Embodiment A33 is the process as set forth in any one of embodiments A23 to A32 wherein the pH of the biologically treated waste stream is less than about 6, less than about 5, less than about 4, less than about 3, or less than about 2.

Embodiment A34 is the process as set forth in any one of embodiments A23 to A33 wherein the precipitant comprises a metal selected from the group consisting of calcium, aluminum, iron, magnesium, and mixtures thereof.

Embodiment A35 is the process as set forth in embodiment A34 wherein the precipitant comprises aluminum.

Embodiment A36 is the process as set forth in embodiment A34 wherein the precipitant is selected from the group consisting of $FeCl_3$, $Al_2(SO_4)_3$, CaO, and combinations thereof.

Embodiment A37 is the process as set forth in embodiment A36 wherein the precipitant is $Al_2(SO_4)_3$.

Embodiment A38 is the process as set forth in any one of embodiments A23 to A37 wherein the waste stream and/or oxidized treated stream is contacted with the precipitant at a rate of from about 0.05 g/l to about 2 g/l, from about 0.1 g/l to about 1.75 g/l, from about 0.1 g/l to about 1.5 g/l, from about 0.1 g/l to about 1.25 g/l, or from about 0.1 g/l to about 1.15 g/l.

Embodiment A39 is the process as set forth in any one of embodiments A24 to A37 wherein the oxidized treated stream is contacted with the precipitant at a weight ratio of precipitant to oxidizing agent of from about 50:1 to about 500:1, from about 100:1 to about 500:1, from about 200:1 to about 400:1, from about 250:1 to about 300:1, or from about 275:1 to about 300:1.

Embodiment A40 is the process as set forth in any one of embodiments A23 to A39 wherein the treated waste stream comprises no more than about 3 ppm, no more than about 2 ppm, no more than about 1.5 ppm, no more than about 1.25 ppm, no more than about 1.1 ppm, no more than about 1 ppm, no more than about 0.9 ppm, no more than about 0.8 ppm, no more than about 0.7 ppm, no more than about 0.6 ppm, no more than about 0.5 ppm, no more than about 0.4 ppm, no more than about 0.3 ppm, no more than about 0.25 ppm, no more than about 0.2 ppm, no more than about 0.15 ppm, no more than about 0.1 ppm, or no more than about 0.05 ppm phosphorous.

Embodiment A41 is the process as set forth in any one of embodiments A23 to A40 wherein the chemical oxygen demand (COD) of the treated waste stream is no more than about 50,000 ppm, no more than about 40,000 ppm, no more than about 30,000 ppm, no more than about 25,000 ppm, no more than about 20,000 ppm, no more than about 15,000 ppm, no more than about 10,000 ppm, no more than about 5,000 ppm, or no more than about 1,000 ppm.

Embodiment A42 is the process as set forth in any one of embodiments A23 to A40 wherein the chemical oxygen demand (COD) of the treated waste stream is between about 50,000 ppm and about 500 ppm, between about 40,000 ppm and about 500 ppm, between about 30,000 ppm and about 500 ppm, between about 20,000 ppm and about 500 ppm, between about 10,000 ppm and about 500 ppm, between about 5,000 ppm and about 500 ppm, or between about 5,000 ppm and about 1,000 ppm.

Embodiment A43 is the process as set forth in any one of embodiments A23 to A42 wherein the total phosphorous removal [(weight $P_{waste\ stream}$-weight $P_{treated\ waste}$ stream)/(weight $P_{waste\ stream}$)×100] is at least about 50%, at least about 60%, at least about 65%, at least about 70%, at least about 75%, at least about 80%, at least about 90%, or at least about 95%.

Embodiment A44 is the process as set forth in any one of embodiments A23 to A43 wherein the total COD removal [($COD_{waste\ stream}$-$COD_{treated\ waste\ stream}$)/($COD_{waste\ stream}$)× 100] is at least about 50%, at least about 60%, at least about 70%, at least about 75%, at least about 80%, at least about 90%, or at least about 95%.

Embodiment A45 is a process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

removing a portion of the waste stream comprising one or more organic phosphorus compounds and phosphate as a precipitation phosphate liquor stream and contacting the precipitation phosphate liquor stream with a precipitant thereby forming within the precipitation phosphate liquor stream phosphate containing precipitates and producing a precipitant treated phosphate stream;

combining the precipitant treated phosphate stream with the waste stream to form a combined precipitant treated phosphate waste stream and subjecting the combined precipitant treated phosphate waste stream to biological treatment to form a biologically treated waste stream; and recovering a phosphate containing cake from the biologically treated waste stream, thereby forming a treated waste stream.

Embodiment A46 is a process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

removing a portion of the waste stream comprising one or more organic phosphorus compounds and phosphate as a oxidation phosphate liquor stream and contacting the oxidation phosphate liquor stream with an oxidizing agent to oxidize at least one organic phosphorus compound to form phosphate ($PO_4^{3-}$) and thereby forming an oxidized phosphate stream;

combining the oxidized phosphate stream with the waste stream to form a combined oxidized phosphate waste stream and contacting the combined oxidized phosphate waste stream with a precipitant, producing a precipitant treated phosphate stream;

subjecting the precipitant treated phosphate stream to biological treatment to form a biologically treated waste stream; and recovering a phosphate containing cake from the biologically treated waste stream, thereby forming a treated waste stream.

Embodiment A47 is the process as set forth in embodiment A46 wherein the oxidizing agent is selected from the group consisting of calcium hypochlorite, sodium hypochlorite, bleach, and combinations thereof.

Embodiment A48 is the process as set forth in embodiment A46 or A47 wherein the oxidizing agent is bleach.

Embodiment A49 is the process as set forth in any one of embodiments A46 to A48 wherein the phosphate liquor stream prior to contact with the oxidizing agent has a pH of from about 1 to about 7.5, from about 1.5 to about 7, from about 2 to about 6.5, from about 2.3 to about 6.5, from about 2.5 to about 6, from about 3 to about 5.5, or from about 3.5 to about 5.

Embodiment A50 is the process as set forth in any one of embodiments A46 to A49 wherein the phosphate liquor stream is contacted with an oxidizing agent for at least about 15 minutes, at least about 30 minutes, at least about 45 minutes, at least about 1 hour, at least about 1.5 hours, at least about 2 hours, or at least about 3 hours.

Embodiment A51 is the process as set forth in any one of embodiments A46 to A50 wherein the molar ratio of oxidizing agent to glyphosate present in the phosphate liquor stream is at least about 1:1, at least about 2:1, at least about 3:1, at least about 5:1, at least about 10:1, or at least about 15:1.

Embodiment A52 is the process as set forth in any one of embodiments A46 to A50 wherein the molar ratio of oxidizing agent to AMPA present in the phosphate liquor stream is at least about 1:1, at least about 2:1, at least about 3:1, at least about 5:1, at least about 10:1, or at least about 15:1.

Embodiment A53 is the process as set forth in any one of embodiments A45 to A52 wherein the biological treatment is conducted under aerobic conditions.

Embodiment A54 is the process as set forth in any one of embodiments A45 to A53 wherein the biological treatment is conducted at a temperature of from about 15° C. to about 45° C., from about 20° C. to about 40° C., from about 25° C. to about 40° C., or from about 30° C. to about 35° C.

Embodiment A55 is the process as set forth in any one of embodiments A45 to A54 wherein the pH of the biologically treated waste stream is less than about 6, less than about 5, less than about 4, less than about 3, or less than about 2.

Embodiment A56 is the process as set forth in any one of embodiments A45 to A55 wherein the precipitant comprises a metal selected from the group consisting of calcium, aluminum, iron, magnesium, and mixtures thereof.

Embodiment A57 is the process as set forth in embodiment A56 wherein the precipitant comprises aluminum.

Embodiment A58 is the process as set forth in embodiment A56 wherein the precipitant is selected from the group consisting of $FeCl_3$, $Al_2(SO_4)_3$, CaO, and combinations thereof.

Embodiment A59 is the process as set forth in embodiment A58 wherein the precipitant is $Al_2(SO_4)_3$.

Embodiment A60 is the process as set forth in any one of embodiments A45 to A59 wherein the precipitation phosphate liquor stream and/or combined oxidized phosphate waste stream is contacted with the precipitant at a rate of from about 0.05 g/l to about 2 g/l, from about 0.1 g/l to about 1.75 g/l, from about 0.1 g/l to about 1.5 g/l, from about 0.1 g/l to about 1.25 g/l, or from about 0.1 g/l to about 1.15 g/l.

Embodiment A61 is the process as set forth in any one of embodiments A46 to A59 wherein the combined oxidized phosphate waste stream is contacted with the precipitant at a weight ratio of precipitant to oxidizing agent of from about 50:1 to about 500:1, from about 100:1 to about 500:1, from about 200:1 to about 400:1, from about 250:1 to about 300:1, or from about 275:1 to about 300:1.

Embodiment A62 is the process as set forth in any one of embodiments A45 to A61 wherein the treated waste stream comprises no more than about 3 ppm, no more than about 2 ppm, no more than about 1.5 ppm, no more than about 1.25 ppm, no more than about 1.1 ppm, no more than about 1 ppm, no more than about 0.9 ppm, no more than about 0.8 ppm, no more than about 0.7 ppm, no more than about 0.6 ppm, no more than about 0.5 ppm, no more than about 0.4 ppm, no more than about 0.3 ppm, no more than about 0.25 ppm, no more than about 0.2 ppm, no more than about 0.15 ppm, no more than about 0.1 ppm, or no more than about 0.05 ppm phosphorous.

Embodiment A63 is the process as set forth in any one of embodiments A45 to A62 wherein the chemical oxygen demand (COD) of the treated waste stream is no more than about 50,000 ppm, no more than about 40,000 ppm, no more than about 30,000 ppm, no more than about 25,000 ppm, no more than about 20,000 ppm, no more than about 15,000 ppm, no more than about 10,000 ppm, no more than about 5,000 ppm, or no more than about 1,000 ppm.

Embodiment A64 is the process as set forth in any one of embodiments A45 to A62 wherein the chemical oxygen demand (COD) of the treated waste stream is between about 50,000 ppm and about 500 ppm, between about 40,000 ppm and about 500 ppm, between about 30,000 ppm and about 500 ppm, between about 20,000 ppm and about 500 ppm, between about 10,000 ppm and about 500 ppm, between about 5,000 ppm and about 500 ppm, or between about 5,000 ppm and about 1,000 ppm.

Embodiment A65 is the process as set forth in any one of embodiments A45 to A64 wherein the total phosphorous removal [(weight $P_{waste\ stream}$ −weight $P_{treated\ waste}$ stream)/(weight $P_{waste\ stream}$)×100] is at least about 50%, at least about 60%, at least about 65%, at least about 70%, at least about 75%, at least about 80%, at least about 90%, or at least about 95%.

Embodiment A66 is the process as set forth in any one of embodiments A45 to A65 wherein the total COD removal [($COD_{waste\ stream}$ −$COD_{treated\ waste\ stream}$)/($COD_{waste\ stream}$)×100] is at least about 50%, at least about 60%, at least about 70%, at least about 75%, at least about 80%, at least about 90%, or at least about 95%.

Embodiment A67 is a process for recovery of phosphorus from a waste stream comprising inorganic phosphorous, the process comprising:

subjecting at least a portion of the waste stream to biological treatment to form a biologically treated waste stream;

contacting the biologically treated waste stream with a precipitant, thereby forming within the biologically treated waste stream phosphate containing precipitates, wherein the biologically treated waste stream has a pH of less than 7 when initially contacted with the precipitant; and recovering a phosphate containing cake from the biologically treated waste stream, thereby forming a treated waste stream.

Embodiment A68 is a process for recovery of phosphorus from a waste stream comprising inorganic phosphorous, the process comprising:

subjecting at least a portion of the waste stream to biological treatment to form a biologically treated waste stream;

contacting the biologically treated waste stream with an oxidizing agent to form an oxidized treated waste stream;

contacting the oxidized treated waste stream with a precipitant, thereby forming within the oxidized treated waste stream phosphate containing precipitates; and recovering a phosphate containing cake from the oxidized treated waste stream, thereby forming a treated waste stream.

Embodiment A69 is a process for recovery of phosphorus from a waste stream comprising inorganic phosphorous, the process comprising:

contacting at least a portion of the waste stream with a precipitant, thereby forming within the waste stream phosphate containing precipitates, to produce a precipitant treated stream, wherein the waste stream has a pH of less than 7 when initially contacted with the precipitant;

subjecting at least a portion of the precipitant treated stream to biological treatment to form a biologically treated waste stream; and recovering a phosphate containing cake from the biologically treated waste stream, thereby forming a treated waste stream.

Embodiment A70 is the process as set forth in embodiment A69 wherein at least a portion of the waste stream is contacted with an oxidizing agent prior to contact with a precipitant, to form an oxidized treated stream and thereby oxidizing at least one organic phosphorus compound to form phosphate ($PO_4^{3}$), and wherein the oxidized treated stream is contacted with the precipitant.

Embodiment A71 is a process for recovery of phosphorus from a waste stream comprising inorganic phosphorous, the process comprising:

removing a portion of the waste stream as a precipitation phosphate liquor stream and contacting the precipitation phosphate liquor stream with a precipitant thereby forming within the precipitation phosphate liquor stream phosphate containing precipitates and producing a precipitant treated phosphate stream;

combining the precipitant treated phosphate stream with the waste stream to form a combined precipitant treated phosphate waste stream and subjecting the combined precipitant treated phosphate waste stream to biological treatment to form a biologically treated waste stream; and recovering a phosphate containing cake from the biologically treated waste stream, thereby forming a treated waste stream.

Embodiment A72 is a process for recovery of phosphorus from a waste stream comprising inorganic phosphorous, the process comprising:

removing a portion of the waste stream as a oxidation phosphate liquor stream and contacting the oxidation phosphate liquor stream with an oxidizing agent to oxidize at least one organic phosphorus compound to form phosphate ($PO_4^{3-}$) and thereby forming an oxidized phosphate stream;

combining the oxidized phosphate stream with the waste stream to form a combined oxidized phosphate waste stream and contacting the combined oxidized phosphate waste stream with a precipitant, producing a precipitant treated phosphate stream;

subjecting the precipitant treated phosphate stream to biological treatment to form a biologically treated waste stream; and recovering a phosphate containing cake from the biologically treated waste stream, thereby forming a treated waste stream.

What is claimed is:

1. A process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

subjecting at least a portion of the waste stream comprising one or more organic phosphorus compounds and phosphate ($PO_4^{3-}$) to biological treatment to form a biologically treated waste stream;

contacting the biologically treated waste stream with an oxidizing agent to form an oxidized treated waste stream, wherein the oxidizing agent is selected from the group consisting of calcium hypochlorite, sodium hypochlorite, bleach, and combinations thereof;

contacting the oxidized treated waste stream with a precipitant, thereby forming within the oxidized treated waste stream phosphate containing precipitates, wherein the precipitant comprises a metal selected from the group consisting of calcium, aluminum, iron, magnesium, and mixtures thereof; and recovering a phosphate containing cake from the oxidized treated waste stream, thereby forming a treated waste stream.

2. The process as set forth in claim 1 wherein the oxidizing agent is bleach.

3. The process as set forth in claim 1 wherein the biologically treated waste stream prior to contact with the oxidizing agent has a pH of from about 1 to about 7.5.

4. The process as set forth in claim 1 wherein the molar ratio of oxidizing agent to glyphosate present in the biologically treated waste stream is at least about 1:1.

5. The process as set forth in claim 1 wherein the molar ratio of oxidizing agent to AMPA present in the biologically treated waste stream is at least about 1:1.

6. The process as set forth in claim 1 wherein the precipitant is selected from the group consisting of $FeCl_3$, $Al_2(SO_4)_3$, CaO, and combinations thereof.

7. The process as set forth in claim 1 wherein the biologically treated waste stream is contacted with the precipitant at a rate of from about 0.05 g/l to about 2 g/l.

8. The process as set forth in claim 1 wherein the biologically treated waste stream is contacted with the precipitant at a weight ratio of precipitant to oxidizing agent of from about 50:1 to about 500:1.

9. The process as set forth in claim 1 wherein the treated waste stream comprises no more than about 3 ppm phosphorous.

10. The process as set forth in claim 1 wherein the total phosphorous removal [(weight $P_{waste\ stream}$–weight $P_{treated\ waste\ stream}$)/(weight $P_{waste\ stream}$)×100] is at least about 50%.

11. The process as set forth in claim 1 wherein the total COD removal [($COD_{waste\ stream}$–$COD_{treated\ waste\ stream}$)/($COD_{waste\ stream}$)×100] is at least about 50%.

12. The process as set forth in claim 1 wherein the oxidized treated waste stream is contacted with the precipitant at a rate of from about 0.05 g/l to about 2 g/l.

13. The process as set forth in claim 1 wherein the oxidized treated waste stream is contacted with the precipitant at a weight ratio of precipitant to oxidizing agent of from about 50:1 to about 500:1.

14. A process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

contacting at least a portion of the waste stream comprising one or more organic phosphorus compounds and phosphate ($PO_4^{3-}$) with a precipitant, thereby forming within the waste stream phosphate containing precipitates, to produce a precipitant treated stream, wherein the waste stream has a pH of less than 7 when initially contacted with the precipitant, wherein the precipitant comprises a metal selected from the group consisting of calcium, aluminum, iron, magnesium, and mixtures thereof;

subjecting at least a portion of the precipitant treated stream to biological treatment to form a biologically treated waste stream; and recovering a phosphate containing cake from the biologically treated waste stream, thereby forming a treated waste stream.

15. The process as set forth in claim 14 wherein at least a portion of the waste stream comprising one or more organic phosphorus compounds and phosphate ($PO_4^{3-}$) is contacted with an oxidizing agent prior to contact with a precipitant, to form an oxidized treated stream and thereby oxidizing at least one organic phosphorus compound to form phosphate ($PO_4^{3}$), and wherein the oxidized treated stream is contacted with the precipitant.

16. The process as set forth in claim 14 wherein the total phosphorous removal [(weight $P_{waste\ stream}$−weight $P_{treated\ waste\ stream}$)/(weight $P_{waste\ stream}$)×100] is at least about 50%.

17. The process as set forth in claim 14 wherein the total COD removal [($COD_{waste\ stream}$−$COD_{treated\ waste\ stream}$)/($COD_{waste\ stream}$)×100] is at least about 50%.

18. The process of claim 14 wherein the process further comprises:

removing a portion of the waste stream comprising one or more organic phosphorus compounds and phosphate as a precipitation phosphate liquor stream and contacting the precipitation phosphate liquor stream with the precipitant thereby forming within the precipitation phosphate liquor stream phosphate containing precipitates and producing a precipitant treated phosphate stream; and combining the precipitant treated phosphate stream with the waste stream to form a combined precipitant treated phosphate waste stream and subjecting the combined precipitant treated phosphate waste stream to the biological treatment to form the biologically treated waste stream.

19. A process for recovery of phosphorus from a waste stream comprising one or more organic phosphorus compounds and phosphate ($PO_4^{3-}$), wherein the one or more organic phosphorus compounds comprise N-(phosphonomethyl)glycine (glyphosate) and aminomethylphosphonic acid (AMPA), the process comprising:

removing a portion of the waste stream comprising one or more organic phosphorus compounds and phosphate as an oxidation phosphate liquor stream and contacting the oxidation phosphate liquor stream with an oxidizing agent to oxidize at least one organic phosphorus compound to form phosphate ($PO_4^{3-}$) and thereby forming an oxidized phosphate stream, wherein the oxidizing agent is selected from the group consisting of calcium hypochlorite, sodium hypochlorite, bleach, and combinations thereof;

combining the oxidized phosphate stream with the waste stream to form a combined oxidized phosphate waste stream and contacting the combined oxidized phosphate waste stream with a precipitant, producing a precipitant treated phosphate stream;

subjecting the precipitant treated phosphate stream to biological treatment to form a biologically treated waste stream; and recovering a phosphate containing cake from the biologically treated waste stream, thereby forming a treated waste stream.

* * * * *